(12) United States Patent
Vermeer et al.

(10) Patent No.: US 8,905,739 B2
(45) Date of Patent: Dec. 9, 2014

(54) METHOD AND APPARATUS FOR LAYERWISE PRODUCTION OF A 3D OBJECT

(75) Inventors: Adrianus Johannes Petrus Maria Vermeer, Geldrop (NL); Herman Hendrikus Maalderink, Nuenen (NL); Jacobus Hubertus Theodoor Jamar, Vessem (NL); Andries Rijfers, Kamerik (NL); Mark Herman Else Vaes, Eindhoven (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 13/141,360

(22) PCT Filed: Dec. 18, 2009

(86) PCT No.: PCT/NL2009/050783
§ 371 (c)(1),
(2), (4) Date: Sep. 6, 2011

(87) PCT Pub. No.: WO2010/074566
PCT Pub. Date: Jul. 1, 2010

(65) Prior Publication Data
US 2012/0168989 A1     Jul. 5, 2012

(30) Foreign Application Priority Data

Dec. 22, 2008 (EP) .................................... 08172644
Jul. 7, 2009 (EP) .................................... 09164821

(51) Int. Cl.
*B29C 35/08*     (2006.01)
*B29C 67/00*     (2006.01)

(52) U.S. Cl.
CPC ................................. *B29C 67/007* (2013.01)
USPC ........ 425/115; 425/174.4; 425/375; 264/446; 264/494

(58) Field of Classification Search
USPC ................ 425/115, 174.4, 375; 264/446, 494
See application file for complete search history.

(56) References Cited

U.S. PATENT DOCUMENTS

| 3,545,997 A | 12/1970 | Hochberg |
| 4,575,330 A | 3/1986 | Hull |

(Continued)

FOREIGN PATENT DOCUMENTS

| DE | 102006019860 | 11/2006 |
| EP | 0466422 | 1/1992 |

(Continued)

OTHER PUBLICATIONS

International Search Report and Written Opinion mailed Feb. 15, 2010 (PCT/NL2009/050783); ISA/EP.

(Continued)

*Primary Examiner* — Timothy Kennedy
*Assistant Examiner* — David N Brown, II
(74) *Attorney, Agent, or Firm* — Banner & Witcoff, Ltd.

(57) ABSTRACT

A system and method of layerwise production of a tangible object (5), they system comprising a construction shape (6) to form a liquid layer to be brought in contact with the tangible object; solidifying means (9) for solidifying a predetermined area of a layer (10) of the liquid (3), so as to obtain a solid layer (14) of the tangible object (5), the solid layer thus having a predetermined shape, separating means (18; 19'; 19") for separating said solid layer from said construction shape; moving means (18) for moving, relative to one another, the construction shape (6) to a predetermined position relative to the tangible object (5), for carrying out a successive such method cycle for solidifying a predetermined area of a successive such liquid layer; the system is arranged to provide a limited volume of liquid adhered to the construction shape to form a liquid layer of limited height that does not contact the tangible object; wherein said moving of said construction shape and said solidifying of said predetermined area are carried out to take place simultaneously.

10 Claims, 14 Drawing Sheets

(56) References Cited

U.S. PATENT DOCUMENTS

| | | | |
|---|---|---|---|
| 4,752,498 A | 6/1988 | Fudim | |
| 4,801,477 A | 1/1989 | Fudim | |
| 4,929,402 A | 5/1990 | Hull | |
| 4,996,010 A | 2/1991 | Modrek | |
| 4,999,143 A | 3/1991 | Hull et al. | |
| 5,015,424 A | 5/1991 | Smalley | |
| 5,058,988 A | 10/1991 | Spence | |
| 5,059,359 A | 10/1991 | Hull et al. | |
| 5,071,337 A | 12/1991 | Heller et al. | |
| 5,076,974 A | 12/1991 | Modrek et al. | |
| 5,096,530 A | 3/1992 | Cohen | |
| 5,104,592 A | 4/1992 | Hull et al. | |
| 5,130,064 A | 7/1992 | Smalley et al. | |
| 5,133,987 A * | 7/1992 | Spence et al. | 427/581 |
| 5,135,379 A * | 8/1992 | Fudim | 425/174.4 |
| 5,137,662 A | 8/1992 | Hull et al. | |
| 5,141,680 A | 8/1992 | Almquist et al. | |
| 5,143,663 A | 9/1992 | Leyden et al. | |
| 5,143,817 A | 9/1992 | Lawton et al. | |
| 5,164,128 A | 11/1992 | Modrek et al. | |
| 5,171,490 A | 12/1992 | Fudim | |
| 5,174,931 A | 12/1992 | Almquist et al. | |
| 5,174,943 A | 12/1992 | Hull | |
| 5,182,055 A | 1/1993 | Allison et al. | |
| 5,182,056 A | 1/1993 | Spence et al. | |
| 5,182,715 A | 1/1993 | Vorgitch et al. | |
| 5,184,307 A | 2/1993 | Hull et al. | |
| 5,192,469 A | 3/1993 | Smalley et al. | |
| 5,192,559 A * | 3/1993 | Hull et al. | 425/89 |
| 5,209,878 A | 5/1993 | Smalley et al. | |
| 5,234,636 A | 8/1993 | Hull et al. | |
| 5,236,637 A | 8/1993 | Hull | |
| 5,238,639 A | 8/1993 | Vinson et al. | |
| 5,248,456 A | 9/1993 | Evans, Jr. et al. | |
| 5,256,340 A | 10/1993 | Allison et al. | |
| 5,258,146 A | 11/1993 | Almquist et al. | |
| 5,267,013 A | 11/1993 | Spence | |
| 5,273,691 A | 12/1993 | Hull et al. | |
| 5,306,446 A | 4/1994 | Howe | |
| 5,321,622 A | 6/1994 | Snead et al. | |
| 5,344,298 A | 9/1994 | Hull | |
| 5,345,391 A | 9/1994 | Hull et al. | |
| 5,358,673 A | 10/1994 | Heller et al. | |
| 5,447,822 A | 9/1995 | Hull et al. | |
| 5,481,470 A | 1/1996 | Snead et al. | |
| 5,495,328 A | 2/1996 | Spence et al. | |
| 5,501,824 A | 3/1996 | Almquist et al. | |
| 5,529,473 A | 6/1996 | Lawton et al. | |
| 5,554,336 A | 9/1996 | Hull | |
| 5,556,590 A | 9/1996 | Hull | |
| 5,569,349 A | 10/1996 | Almquist et al. | |
| 5,569,431 A | 10/1996 | Hull | |
| 5,571,471 A | 11/1996 | Hull | |
| 5,573,722 A | 11/1996 | Hull | |
| 5,597,520 A | 1/1997 | Smalley et al. | |
| 5,598,340 A | 1/1997 | Medard et al. | |
| 5,609,812 A | 3/1997 | Childers et al. | |
| 5,609,813 A | 3/1997 | Allison et al. | |
| 5,610,824 A | 3/1997 | Vinson et al. | |
| 5,611,880 A | 3/1997 | Onishi | |
| 5,630,981 A | 5/1997 | Hull | |
| 5,637,169 A | 6/1997 | Hull et al. | |
| 5,650,260 A * | 7/1997 | Onishi | 430/269 |
| 5,651,934 A | 7/1997 | Almquist et al. | |
| 5,667,820 A | 9/1997 | Heller et al. | |
| 5,672,312 A | 9/1997 | Almquist et al. | |
| 5,676,904 A | 10/1997 | Almquist et al. | |
| 5,688,464 A | 11/1997 | Jacobs et al. | |
| 5,693,144 A | 12/1997 | Jacobs et al. | |
| 5,695,707 A | 12/1997 | Almquist et al. | |
| 5,711,911 A | 1/1998 | Hull | |
| 5,762,856 A | 6/1998 | Hull | |
| 5,776,409 A | 7/1998 | Almquist et al. | |
| 5,779,967 A | 7/1998 | Hull | |
| 5,785,918 A | 7/1998 | Hull | |
| 5,814,265 A | 9/1998 | Hull | |
| 5,840,239 A | 11/1998 | Partanen et al. | |
| 5,854,748 A | 12/1998 | Snead et al. | |
| 5,855,718 A | 1/1999 | Nguyen et al. | |
| 5,855,836 A | 1/1999 | Leyden et al. | |
| 5,870,307 A | 2/1999 | Hull et al. | |
| 5,885,511 A | 3/1999 | Heller et al. | |
| 5,891,382 A | 4/1999 | Almquist et al. | |
| 5,902,537 A | 5/1999 | Almquist et al. | |
| 5,902,538 A | 5/1999 | Kruger et al. | |
| 5,936,861 A | 8/1999 | Jang et al. | |
| 5,943,235 A | 8/1999 | Earl et al. | |
| 5,945,058 A | 8/1999 | Manners et al. | |
| 5,965,079 A | 10/1999 | Manners | |
| 5,989,476 A | 11/1999 | Lockard et al. | |
| 5,989,679 A | 11/1999 | Sauerhoefer | |
| 5,999,184 A | 12/1999 | Smalley et al. | |
| 6,001,297 A | 12/1999 | Partanen et al. | |
| 6,027,324 A | 2/2000 | Hull | |
| 6,027,682 A | 2/2000 | Almquist et al. | |
| 6,029,096 A | 2/2000 | Manners et al. | |
| 6,036,911 A | 3/2000 | Allison et al. | |
| 6,048,487 A | 4/2000 | Almquist et al. | |
| 6,084,980 A | 7/2000 | Nguyen et al. | |
| 6,103,176 A | 8/2000 | Nguyen et al. | |
| 6,107,008 A | 8/2000 | Howell et al. | |
| 6,110,602 A | 8/2000 | Dickens et al. | |
| 6,132,665 A | 10/2000 | Bui et al. | |
| 6,133,353 A | 10/2000 | Bui et al. | |
| 6,133,355 A | 10/2000 | Leyden et al. | |
| 6,157,663 A | 12/2000 | Wu et al. | |
| 6,172,996 B1 | 1/2001 | Partanen et al. | |
| 6,179,601 B1 | 1/2001 | Kruger et al. | |
| 6,180,050 B1 | 1/2001 | Arai et al. | |
| 6,193,923 B1 | 2/2001 | Leyden et al. | |
| 6,200,514 B1 | 3/2001 | Meister | |
| 6,215,095 B1 | 4/2001 | Partanen et al. | |
| 6,261,506 B1 | 7/2001 | Nguyen et al. | |
| 6,261,507 B1 | 7/2001 | Gigl et al. | |
| 6,264,873 B1 | 7/2001 | Gigl et al. | |
| 6,270,335 B2 | 8/2001 | Leyden et al. | |
| 6,309,581 B1 | 10/2001 | Gervasi | |
| 6,333,741 B1 | 12/2001 | Snead et al. | |
| 6,347,101 B1 | 2/2002 | Wu et al. | |
| 6,366,825 B1 | 4/2002 | Smalley et al. | |
| 6,395,811 B1 | 5/2002 | Nguyen et al. | |
| 6,397,922 B1 | 6/2002 | Sachs et al. | |
| 6,399,010 B1 | 6/2002 | Guertin et al. | |
| 6,406,531 B1 | 6/2002 | Bui et al. | |
| 6,409,902 B1 | 6/2002 | Yang et al. | |
| 6,500,378 B1 | 12/2002 | Smith | |
| 6,508,971 B2 | 1/2003 | Leyden et al. | |
| 6,528,613 B1 | 3/2003 | Bui et al. | |
| 6,529,265 B1 | 3/2003 | Henningsen | |
| 6,532,394 B1 | 3/2003 | Earl et al. | |
| 6,547,552 B1 | 4/2003 | Fudim | |
| 6,558,606 B1 | 5/2003 | Kulkarni et al. | |
| 6,564,852 B1 | 5/2003 | Wendt et al. | |
| 6,600,965 B1 | 7/2003 | Hull et al. | |
| 6,622,062 B1 | 9/2003 | Earl et al. | |
| 6,627,376 B1 | 9/2003 | Ueno | |
| 6,629,559 B2 | 10/2003 | Sachs et al. | |
| 6,630,009 B2 | 10/2003 | Moussa et al. | |
| 6,641,897 B2 | 11/2003 | Gervasi | |
| 6,660,209 B2 | 12/2003 | Leyden et al. | |
| 6,699,424 B2 | 3/2004 | Nguyen et al. | |
| 6,752,948 B2 | 6/2004 | Newell et al. | |
| 6,771,226 B1 | 8/2004 | Dujmovic | |
| 6,797,351 B2 | 9/2004 | Kulkarni et al. | |
| 6,814,926 B2 | 11/2004 | Geving et al. | |
| 6,825,433 B2 | 11/2004 | Wright et al. | |
| 6,833,231 B2 | 12/2004 | Moussa et al. | |
| 6,841,116 B2 | 1/2005 | Schmidt | |
| 6,841,589 B2 | 1/2005 | Schmidt et al. | |
| 6,855,482 B2 | 2/2005 | McLean et al. | |
| 6,902,246 B2 | 6/2005 | Varnon et al. | |
| 6,915,178 B2 | 7/2005 | O'Brien et al. | |
| 6,916,441 B2 | 7/2005 | Newell et al. | |
| 6,927,018 B2 | 8/2005 | Burgess | |

(56) References Cited

U.S. PATENT DOCUMENTS

| | | |
|---|---|---|
| 6,932,145 B2 | 8/2005 | Frasier et al. |
| 6,936,212 B1 | 8/2005 | Crawford |
| 6,974,656 B2 | 12/2005 | Hinczewski |
| 6,989,225 B2 | 1/2006 | Steinmann |
| 7,052,263 B2 | 5/2006 | John |
| 7,074,029 B2 | 7/2006 | Stockwell et al. |
| 7,077,638 B2 | 7/2006 | Leyden et al. |
| 7,090,484 B2 | 8/2006 | Ueno |
| 7,125,649 B2 | 10/2006 | McLean et al. |
| 7,128,866 B1 | 10/2006 | Henningsen |
| 7,137,801 B2 | 11/2006 | Ueno |
| 7,153,135 B1 | 12/2006 | Thomas |
| 7,176,253 B2 | 2/2007 | Xu et al. |
| 7,195,472 B2 | 3/2007 | John |
| 7,270,528 B2 | 9/2007 | Sherwood |
| 7,271,877 B2 | 9/2007 | Fries |
| 7,285,237 B2 | 10/2007 | Newell et al. |
| 7,318,718 B2 | 1/2008 | Ueno |
| 7,327,377 B2 | 2/2008 | Matsumoto |
| 7,358,283 B2 | 4/2008 | Xu |
| 7,378,460 B2 | 5/2008 | Schmidt et al. |
| 7,399,796 B2 | 7/2008 | Xu et al. |
| 7,402,273 B2 | 7/2008 | Sherwood |
| 7,438,846 B2 | 10/2008 | John |
| 7,467,939 B2 | 12/2008 | Sperry et al. |
| 7,520,740 B2 | 4/2009 | Wahlstrom et al. |
| 7,585,450 B2 | 9/2009 | Wahlstrom et al. |
| 7,614,866 B2 | 11/2009 | Sperry et al. |
| 7,621,733 B2 | 11/2009 | Reynolds et al. |
| 7,636,610 B2 | 12/2009 | Schillen et al. |
| 7,690,909 B2 | 4/2010 | Wahlstrom |
| 7,706,910 B2 | 4/2010 | Hull et al. |
| 7,731,887 B2 | 6/2010 | Hull et al. |
| 7,771,183 B2 | 8/2010 | Hull et al. |
| 7,845,930 B2 | 12/2010 | Shkolnik et al. |
| 7,892,474 B2 | 2/2011 | Shkolnik et al. |
| 7,894,921 B2 | 2/2011 | John et al. |
| 7,931,851 B2 | 4/2011 | Ueno |
| 8,003,039 B2 | 8/2011 | Sperry et al. |
| 2001/0025203 A1 | 9/2001 | Gervasi |
| 2001/0048183 A1 | 12/2001 | Fujita |
| 2002/0013636 A1 | 1/2002 | O'Brien et al. |
| 2002/0157799 A1 | 10/2002 | Sachs et al. |
| 2003/0062145 A1 | 4/2003 | Frasier et al. |
| 2003/0082487 A1 | 5/2003 | Burgess |
| 2003/0189028 A1 | 10/2003 | Wright et al. |
| 2003/0190472 A1 | 10/2003 | Moussa |
| 2004/0094870 A1 | 5/2004 | Ueno |
| 2004/0134250 A1 | 7/2004 | Durney et al. |
| 2004/0137368 A1 | 7/2004 | Steinmann |
| 2004/0170923 A1 | 9/2004 | Steinmann et al. |
| 2004/0182202 A1 | 9/2004 | Geving et al. |
| 2004/0226405 A1 | 11/2004 | Geving et al. |
| 2004/0229002 A1 | 11/2004 | Davis et al. |
| 2005/0040562 A1 | 2/2005 | Steinmann et al. |
| 2005/0208168 A1 | 9/2005 | Hickerson |
| 2006/0046010 A1 | 3/2006 | Davis et al. |
| 2006/0078638 A1 | 4/2006 | Holmboe et al. |
| 2006/0239588 A1 | 10/2006 | Hull et al. |
| 2006/0249884 A1* | 11/2006 | Partanen et al. ............... 264/401 |
| 2006/0267252 A1 | 11/2006 | Steinmann et al. |
| 2007/0019174 A1 | 1/2007 | Tinnemans et al. |
| 2007/0063366 A1 | 3/2007 | Cunningham et al. |
| 2007/0071902 A1 | 3/2007 | Dietrich et al. |
| 2007/0074659 A1 | 4/2007 | Wahlstrom |
| 2007/0075461 A1 | 4/2007 | Hunter et al. |
| 2007/0077323 A1 | 4/2007 | Stonesmith et al. |
| 2007/0257055 A1 | 11/2007 | Scott et al. |
| 2008/0054531 A1 | 3/2008 | Kerekes et al. |
| 2008/0113293 A1 | 5/2008 | Shkolnik et al. |
| 2008/0169586 A1* | 7/2008 | Hull et al. ................ 264/401 |
| 2008/0171284 A1 | 7/2008 | Hull et al. |
| 2008/0179786 A1 | 7/2008 | Sperry et al. |
| 2008/0179787 A1 | 7/2008 | Sperry et al. |
| 2008/0180515 A1 | 7/2008 | Nomura et al. |
| 2008/0181977 A1 | 7/2008 | Sperry et al. |
| 2008/0206383 A1 | 8/2008 | Hull et al. |
| 2008/0217818 A1 | 9/2008 | Holmboe et al. |
| 2008/0226346 A1 | 9/2008 | Hull et al. |
| 2008/0231731 A1 | 9/2008 | Hull et al. |
| 2008/0259228 A1 | 10/2008 | Henningsen |
| 2008/0259306 A1 | 10/2008 | Henningsen |
| 2008/0315461 A1 | 12/2008 | Henningsen |
| 2009/0267269 A1 | 10/2009 | Lim et al. |
| 2011/0272857 A1 | 11/2011 | Sperry et al. |

FOREIGN PATENT DOCUMENTS

| | | |
|---|---|---|
| EP | 0748684 | 12/1996 |
| EP | 0787547 | 8/1997 |
| EP | 0958912 | 11/1999 |
| EP | 1025981 A2 | 8/2000 |
| EP | 1250997 | 10/2002 |
| EP | 1354658 | 10/2003 |
| EP | 1482684 | 12/2004 |
| EP | 1719607 | 11/2006 |
| EP | 1719607 A1 | 11/2006 |
| EP | 1733866 | 12/2006 |
| EP | 1849586 | 10/2007 |
| EP | 1849587 | 10/2007 |
| EP | 1852243 | 11/2007 |
| EP | 1852244 | 11/2007 |
| EP | 1880830 | 1/2008 |
| EP | 1894705 | 3/2008 |
| EP | 1935620 | 6/2008 |
| EP | 1946907 | 7/2008 |
| EP | 1946908 | 7/2008 |
| EP | 1950032 | 7/2008 |
| EP | 1982824 | 10/2008 |
| EP | 2011631 | 1/2009 |
| EP | 2075110 A1 | 7/2009 |
| EP | 2199067 | 6/2010 |
| GB | 2309658 | 8/1997 |
| GB | 2348393 | 10/2000 |
| JP | 57176721 | 10/1982 |
| JP | 2001205708 | 7/2001 |
| KR | 20040022725 | 3/2004 |
| KR | 20040100320 | 12/2004 |
| KR | 20040100321 | 12/2004 |
| KR | 100531688 | 11/2005 |
| KR | 100930788 | 12/2009 |
| KR | 20100080298 | 7/2010 |
| KR | 10-1006414 | 1/2011 |
| WO | 8806494 | 9/1988 |
| WO | 8910254 | 11/1989 |
| WO | 9110211 | 7/1991 |
| WO | 9847042 | 10/1998 |
| WO | 9847048 | 10/1998 |
| WO | 9939889 | 8/1999 |
| WO | 0021735 | 4/2000 |
| WO | 00/30834 A1 | 6/2000 |
| WO | 0051761 | 9/2000 |
| WO | 0057253 | 9/2000 |
| WO | 01/40866 A2 | 6/2001 |
| WO | 0189738 | 11/2001 |
| WO | 2004028937 | 4/2004 |
| WO | 2004108588 | 12/2004 |
| WO | 2005110721 | 11/2005 |
| WO | 2006110489 | 10/2006 |
| WO | 2006122564 | 11/2006 |
| WO | 2008004872 | 1/2008 |
| WO | 2008007956 | 1/2008 |
| WO | 2008010708 | 1/2008 |
| WO | 2008010715 | 1/2008 |
| WO | 2008055533 | 5/2008 |
| WO | 2008088637 | 7/2008 |
| WO | 2008088638 | 7/2008 |
| WO | 2008088639 | 7/2008 |
| WO | 2008088640 | 7/2008 |
| WO | 2008088641 | 7/2008 |
| WO | 2008088642 | 7/2008 |
| WO | 2009084957 | 7/2009 |
| WO | 2009102200 | 8/2009 |
| WO | 2009132245 | 10/2009 |

(56) References Cited

FOREIGN PATENT DOCUMENTS

| WO | 2010074566 | 7/2010 |
|---|---|---|
| WO | 2010087708 | 8/2010 |
| WO | 2010101465 | 9/2010 |
| WO | 2010101466 | 9/2010 |

OTHER PUBLICATIONS

Kaneko, Y., et al. "UV Exposure System for Photolithography and Rapid Prototyping Using DMD Projector", Department of Electrical and Electronic Systems, Faculty of Engineering, Saitama University, 2001, 4 pages.

Carima Article retrieved from the Internet http://www.carima.com on Apr. 25, 2012, 1 page.

Avingnews.network Article, Special Report on "CEATEC Japan 2009" retrieved from the Internet http://news.nate.com/view/20091012n20947 on Apr. 25, 2012, 4 pages.

Avingnews.network Article retrieved from the Internet http://news.nate.com/view/20090414n17941 on Apr. 25, 2012, 4 pages.

\* cited by examiner

METHOD AND APPARATUS FOR LAYERWISE PRODUCTION OF A 3D OBJECT

CROSS REFERENCE TO RELATED APPLICATIONS/PRIORITY CLAIM

The present application is a U.S. National Phase filing of International Application No. PCT/NL2009/050783 filed on Dec. 18, 2009, designating the United States of America and claiming priority to both European patent application No. 08172644.0, filed on Dec. 22, 2008, and European patent application No. 09164821.2, filed on Jul. 7, 2009. All the above applications are incorporated by reference herein in their entirety.

FIELD AND BACKGROUND OF THE INVENTION

The invention relates to a method for layerwise production of a tangible object. The invention also relates to a system for layerwise production of a tangible object.

Such a method is known. For example it is known from U.S. Pat. No. 6,547,552 a small volume of liquid is pressed between a foil and a tangible object to provide a thin liquid layer than can be solidified. The flexible foil is transmittent to curing radiation. A firstly formed solid layer of the tangible object is adhered to the underside of the carrier plate by selectively solidifying the liquid. Consecutively formed solid layers are each adhered to a previously formed solid layer, respectively.

Each time after solidification of a new layer, a foil guiding stage is moved to peel off the foil from the earlier solidified layers adhered thereon in order to separate the last formed solid layer from the foil.

A desire exists to increase the speed of the production process.

SUMMARY OF THE INVENTION

It is an object of the invention to enable a faster production of a tangible object.

Therefore, according to a first aspect of the invention, a method is provided.

In this method according to the first aspect of the invention, a construction shape is provided; and method cycles are repeatedly performed, each method cycle comprising the steps of:

providing a liquid layer on the construction shape of limited height that does not contact the tangible object;

moving, relative to one another, the construction shape to a predetermined position relative to the tangible object, for carrying out a successive such method cycle for solidifying a predetermined area of a successive such liquid layer;

solidifying a predetermined area of a layer of the liquid so as to obtain a solid layer of the tangible object, the solid layer thus having a predetermined shape; and separating said solid layer from said construction shape;

wherein for at least one of said method cycles said moving of said construction shape and said solidifying of said predetermined area are carried out to take place simultaneously. Favourable effects of such simultaneous movement and solidifying are elucidated as follows.

At first, the simultaneous movement and solidifying provides a speed gain of the process in itself. That is, the start of solidifying a layer does not have to wait until all parts of the layer have been provided with the liquid. Hence, there is little or no downtime of the solidifying means. Furthermore, operation is simplified and material cost can be decreased.

Furthermore, according to a second aspect of the invention, a system is provided.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION

Figure 1:
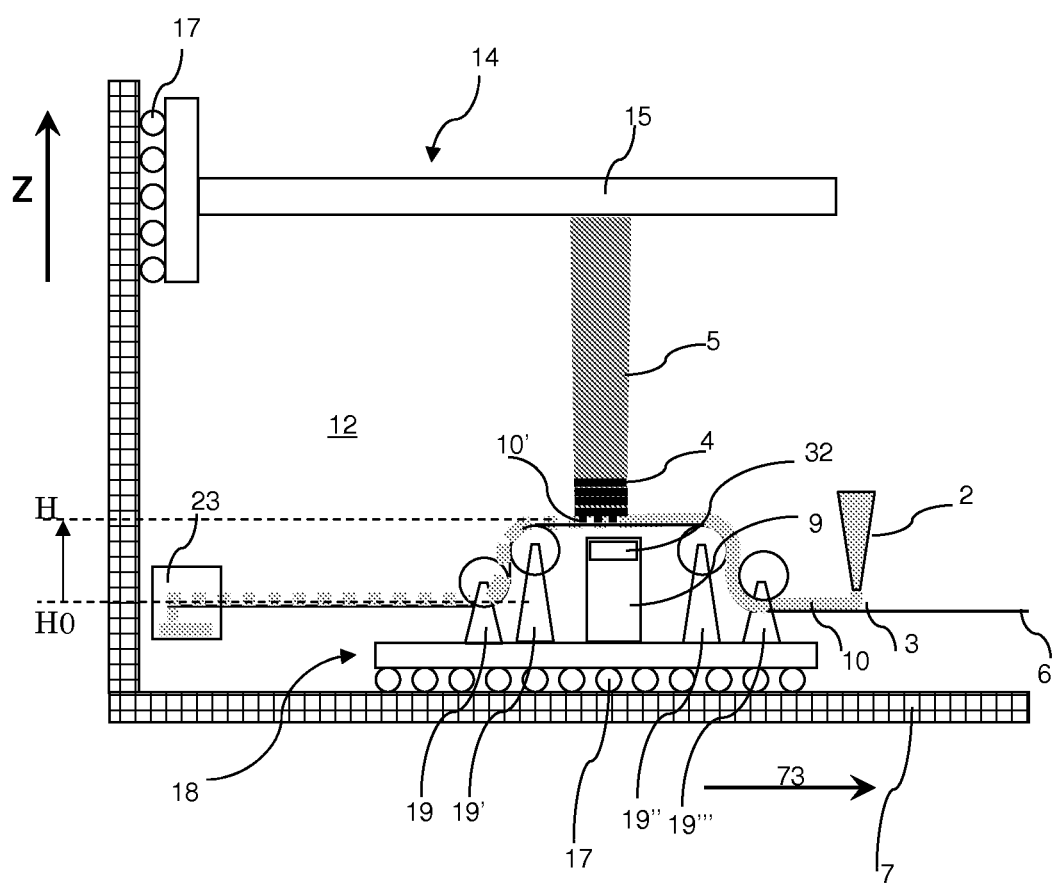
FIG. 1 schematically shows a sectional side view of an example of an embodiment of a system according to the invention.

Each of the examples of FIGS. 1-6 relates to a system that can perform an example of a method disclosed herein. In the respective figures sometimes the same reference signs are used for similar or identical parts or aspects of the systems.

Hence, each of the examples of FIGS. 1-6 relates to an example embodiment of a system for layerwise production of a tangible object 5. The systems may comprise: a construction shape 6 onto which a liquid layer is applied; a solidifier 9 for solidifying a predetermined area of a layer 10 of the liquid 3, so as to obtain a solid layer 4 of the tangible object 5, the solid layer thus having a predetermined shape; a separator 18; 19'; 19" for separating said solid layer from said construction shape; and a mover 18 for moving, relative to one another, the construction shape 6 to a predetermined position relative to the tangible object 5, for carrying out a successive such method cycle for solidifying a predetermined area of a successive such liquid layer. Preferably but not necessarily the system comprises a dispenser 2 to dispense a limited volume of liquid adhered to the construction shape and adjust the volume to form a liquid layer of limited height. Before moving of the construction shape to the tangible object, the liquid layer does not contact the tangible object. Additionally, the liquid layer may be formed by dispensing of said layer from a reservoir; and said moving of said construction shape and said dispensing of said liquid layer may be carried out to take place simultaneously.

Reference is now made to FIG. 1, which shows a system 12 according to the invention.

In this embodiment, the system 12 comprises a liquid applicator 2 which, in the shown example, is filled with a liquid 3. The system 12 further comprises a construction shape in the form of a flexible foil 6. On the foil 6, a liquid layer is formed of limited height to be brought in contact with the tangible object 5. The system 12 further comprises a solidifier 9 for solidifying a predetermined area 10 of a layer of the liquid 3, said liquid layer 10 adjoining the construction shape 6, so as to obtain a solid layer 4 of the tangible object 5, the solid layer thus having a predetermined shape.

In one embodiment, the solidifier 9 is an energy source arranged to project a pattern through the foil 6 when the liquid layer 3 contacts the tangible object 5. In particular, the energy source 9 is arranged for at least partially curing at least part of an intersection pattern in the liquid layer. To enable the light or other radiation of the solidifier 9 to solidify the liquid layer 3, the construction shape 6 (flexible foil 6) is preferably substantially transparent to the radiation.

As will be explained somewhat further below, the system 12 may further comprise a separator for separating said solid layer 4 from said construction shape 6. Additionally, the separator removes unsolidified parts from the tangible object so as to obtain a solid layer (14) of the tangible object (5), the solid layer thus having a predetermined shape.

The system 1 further comprises a mover 18 arranged to move, relative to one another, the construction shape 6 to a predetermined position relative to the tangible object 5, for carrying out a successive such method cycle for solidifying a predetermined area of a successive such layer 4. In this way the mover can position the construction form in successive steps to form multiple layers of the tangible object.

In one embodiment, the mover comprises a movable foil guiding stage 18 located below the construction shape 6. Further, in the shown example embodiment, the energy source 9 is positioned on the movable foil guiding stage 18, between foil guiding elements 19, to expose the layer of uncured material through the foil 6.

In one embodiment, each time after solidification and separation of a new layer, carrier plate (z-stage) 15 together with the tangible object 5 including solidified layers adhered thereon are moved upwards. Hence, the method for layerwise production of a tangible object is a cyclic method, wherein the described steps of positioning, solidifying, and separating together are comprised in a single cycle step of the method.

In one embodiment, the system is arranged in such a way, that for at least one of said method cycles, a limited volume of liquid 3 is dispensed adhered to the construction shape 6 and adjusted to form a liquid layer 10 of limited height that does not contact the tangible object. This is explained in an example embodiment as follows:

The flexible foil 6 has a liquid contacting side for being in contact with the liquid 3 to form liquid layer 10. At least upper parts in FIG. 1 of the guide 18 are in pressing contact with a side of the flexible foil 6 opposite to the liquid contacting side. In the shown example, said pressing contact is realized by a sliding or rolling movement of the guide 18 along said opposite side of the flexible foil 6. Lower parts in FIG. 1 of the guide 18 are in rolling contact with a support platform by means of rollers 17. Both the guide 18 and the solidifier 9 are movable relative to the platform 7 via these rollers 17 in either or both directions indicated by arrow 73 in FIG. 1. The solidifier may be movable respective to the guide 18.

In the shown example, the foil 6 is transparent to radiation from solidifier 9. As an example it is now assumed that, in the course of time during the performing of a method cycle, the guide 18 and the solidifier 9 are synchronously moving in the right-hand direction of arrow 73 in FIG. 1. Then, at the instantaneous moment in time shown in FIG. 1, there are contacting parts of the layer 10 contacting the tangible object 5 for solidifying certain parts of the layer 10'. During the movement of the guide 18 and the solidifier 9, these contacting parts 10 are time-dependently varying. Thus, over time, the contacting parts 10 may vary depending, in particular, of the position of the guide 18 relative to the tangible object 5.

In FIG. 1 on the left-hand side of the figure, these contacting parts 10 have been separated from said other, already solidified parts of the layer 10.

Movable z-stage 14 can be moved in a z-direction before a new layer of curable material is provided to the tangible object 5. With z-direction is meant the direction transverse to the layer of curable material 3 positioned on the foil 6. The z-stage 14 may be raised while the foil guiding stage 18 is not moving. In this embodiment, rolling elements 17 enable movement of the z-stage 14. Tangible object 5 is connected to the z-stage 15 and in each method cycle a new layer is stacked from below. For sake of clarity, the layer of curable material is shown with an exaggerated thickness.

The apparatus 12 may include a guide in the form of a foil guiding stage 18, for providing a layer of curable material to the tangible object 5. The apparatus 12 may further comprise a remover for removing the uncured material from the layer outside the intersection pattern. In the embodiment of FIG. 1, the foil guiding stage 18 is arranged for dispensing a layer of curable material to the foil, illuminating the layer to solidify a further patterned layer to the tangible object 5, and for removing the uncured material from the layer outside the pattern. As an alternative, removing the uncured material from the layer outside the intersection pattern may be performed by e.g. removing the uncured material with a blower. This is especially suitable when the uncured material has a dry, powder like structure or is a low viscosity liquid.

The foil guiding stage 18 may be movable transverse to the z-direction. In one embodiment, the movement of the foil guiding stage 18 is enabled by rolling elements 17. Other ways of moving, like sliding are also possible. The foil guiding stage 18 further comprises foil guiding elements 19, 19', 19" and 19'" protruding from the stage 18 for guiding a foil 6 along the tangible object 5 so as to apply a layer of curable material to the tangible object 5. In illustrated embodiment 1, the foil guiding elements 19 comprise rollers. The foil guiding stage 18 can be reciprocable. Two foil guiding elements (19, 19') arranged on the stage 18 define a contact height defined by a height H where the tangible object 5 contacts the liquid layer 10 and at least one position HO distanced from the contact height H, for guiding the foil 6 to or from the contact height to contact the tangible object 5 by movement along the tangible object 5 while keeping the foil fixed relative to the tangible object 5 at least during contacting.

The foil 6 can be arranged for carrying the curable layer material 10 supplied from a dispenser 2 to the tangible object 5 and for carrying the removed uncured material away from the tangible object 5, possibly to a residue reservoir 23. Typically, the uncured material outside the intersection pattern sticks to the moving foil 6 because the adhesive force between the uncured material and the foil 6 are larger than the adhesive force between the uncured material and the tangible object 5.

The foil 6 and the foil guiding stage 18 may be moved independently. In one operating mode, in a first step, the foil 6 is moved so as to provide a layer of curable material beneath the tangible object 5. The curable material is, at that time, not yet in contact with the tangible object 5. In a second step, the foil guiding stage 18 moves along the tangible object 5 to apply the layer of curable material to the tangible object 5, expose the curable material and remove the uncured material. In the second step, the foil 6 does not substantially move relative to the tangible object 5 transverse to the z-direction.

The apparatus 12 may comprise an energy source 9 arranged for at least partially curing at least part of an intersection pattern in the layer of curable material 3. In the embodiment of FIG. 1 the energy source 9 comprises a plurality of individually operable LEDs arranged in rows and columns (not shown). The energy source 9 may be moveably disposed relative to the layer of curable material 3, such that it can move in a direction 8 parallel to the layer of curable material 3. The motion of the energy source 9 may be controlled by a controller, which also controls the lighting of the LEDs. In use, the energy source 9 may be moved rectilinearly in a direction that extends at an angle with the directions of the rows and columns of the LED array 32 to enhance the effective resolution of the system. This technique is described in more detail in copending application EP 07150447.6 in the name of applicant, which is incorporated herein by reference for further information regarding this aspect. The energy source 9 may be positioned on the movable foil guiding stage 18, between the protruding foil guiding elements 19 so as to expose the layer of uncured material through the foil 6. The energy source may be covered by a transparent plate, e.g. a glass plate to improve the guidance of the foil 6.

The combination of using a LED light source comprising a plurality of individually operable LEDs and partially curing at least part of the intersection pattern may be advantageous. Before explaining this further, the LED light source as used in this embodiment will be described in some detail.

The LED light source may comprise a two dimensional matrix of typically about 80.times.120 light emitting diodes (LEDs); that are imaged via a multilens array (not shown) to the layer of curable material 3. The length of the matrix is typically about 60 centimeters. The LED's are individually operable to write the intersection pattern with a control speed of an individual LED typically in the order of nanoseconds, by a plurality of electrical pathways, selectively connected to the respective LEDs. In this example, accordingly, the energy source 9 may be provided by a two-dimensional array of LEDs extending in a plane parallel to the layer of curable material 3.

When the complete intersection pattern is fully cured, the LED light source may typically move over the layer of uncured material with a scanning speed of about 10 centimeters per second.

Figure 2:
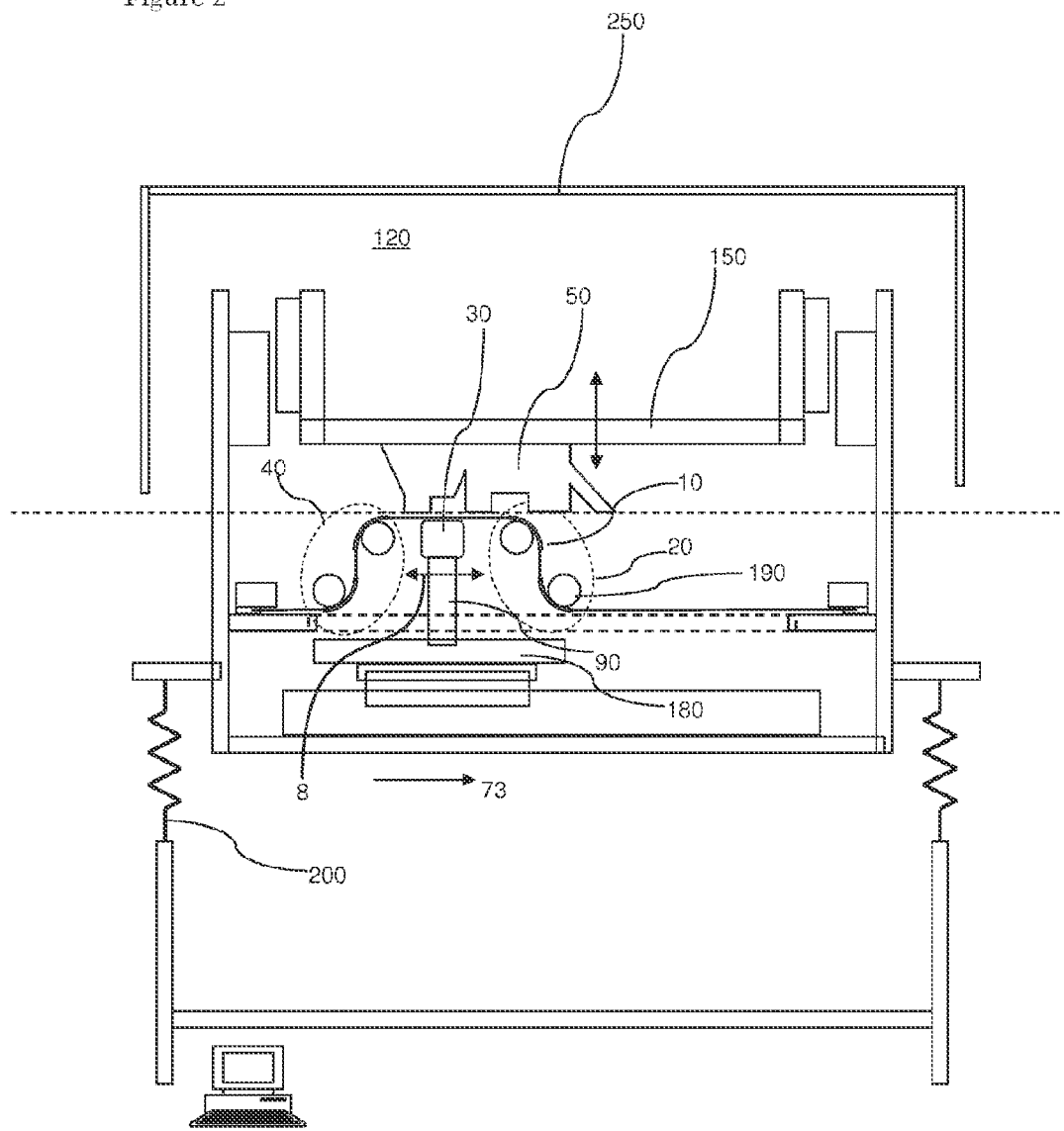
FIG. 2 schematically shows a sectional side view of another example of an embodiment of a system according to the invention.

FIG. 2 shows a further detailed embodiment wherein the subprocesses 'layer provision' 20 and 'solidifying' 30 may be carried out simultaneously. In addition, the separating step 40 may also be carried out in the same operational movement of foil guiding stage 180. Furthermore additional sub processes can be carried out simultaneously, which could include simultaneous execution of other process steps (besides coating-lifting-exposing-peeling) such as foil cleaning, object cleaning, post curing, heating, cooling (compensate for exothermic reaction), and pre-curing). Pre-and post curing steps can be carried out by applying heat or specific radiation as further exemplified in FIG. 6.

The functional process units that carry out these process steps are preferably kept with a limited extension in the movement direction which enhances the simultaneity and thus the overall efficiency. It is noted that the subsystems layer provision and layer removal will be interchanged when reversing movement of stage 180; in FIG. 2, the movement is from left to right (arrow 73). Such a reciprocal solidification process is further exemplified in Figures FIG. 14 and FIG. 15. However, it is also possible that a unidirectional solidification process is performed, wherein, in only a single direction a layer is provided and solidified; and a 'fly back' movement is performed by the stage 180 without performing layer provision and solidification. This may depend on how fast the exposure unit 90 can perform a fly-back movement from end point to start point.

The solidifying means, in the example formed by 'exposure unit' 90 for carrying out the solidification can have a dimension that is limited in the direction of the foil guiding stage 180, since in this direction, by scanning movement, a full length dimension of the tangible object 5 can be built. The simultaneity of the layer provision 20 and solidifying 30 processes can be used to achieve an additional gain in required process time.

As an additional advantage, in contrast to sequential operation, the layer provision 20 and exposure unit 30 used for carrying out said subprocesses can be used more efficiently (close to 100% of the time). In addition, since all of the machine parts for separate process steps can be dimensioned relatively small, high process speed can be provided which diminishes process time for all sub processes.

The figure illustrates a machine in which the product is built by adding layers successively to the underside of the product 50 which is attached to the 'product holder' 150.

The 'working area' is large enough to accommodate the product 50 to be made. The present invention is especially useful when the working area is relatively large, e.g. about 50.times.0.50 cm2.

In FIG. 2 the 'product holder' 150 defines a working area of at least about 50 cm long (from left to right in the figure) and about 50 cm wide (perpendicular to the plane of the drawing).

In one embodiment, for each layer two process steps are always required (1) providing (20) a layer of resin 10, exposure (30) of the resin 10; in many applications there is also releasing (40) the unexposed resin 10 from the building surface ('peeling' in the example of the drawing).

Conventionally these processes may be carried out on the entire working area.

In one aspect of the invention, the processes may be performed on only a small part of the working area at a time. So process equipment (e.g. exposure unit) is required that can address a part of the working area at any instant of time.

Thus, while FIG. 2 illustrates a single foil guiding stage 180 covering at least one length dimension of the working area, a multi stage arrangement can be provided where the processes are carried out in parallel, simultaneously on different parts of the working area. This may considerably reduce a total process time:

In one embodiment, each of the 3 processes requires a process time TP(i), i=1 . . . 3 that is determined by:

the net process time TP(i): e.g. the required exposure time (e.g. lower light output results in a longer exposure time) or the speed at which the process can be carried out: movement [m/s] from left to right. This in turn is determined by properties of e.g. the resin and the product (e.g. the product can only withstand small forces resulting in lower movement speed).

the lead in and lead out time. In the example of the FIG. 2 arrangement, wherein a moving process is depicted by moving a reciprocable guide stage 18, as opposed to stationary process equipment, the distance to be travelled is the length of the working area+the length of the guide stage LPE(i) resulting in an additional process time T PE(i)=LPE(i)/v (where v is the travelling speed).

so the total time for one layer will be:

conventionally for stationary systems: TP1+TP2+TP3.

with the moving stage: max (TP1, TP2, TP3)+TPE1+TPE2+TPE3.

It follows that TP1, TP2 and TP3 are preferably comparable, and when the process equipment can be made small compared to the working area. For large working area, an arrangement comprising a moving foil guiding stage thus may provide process time reduction.

To shorten the length direction of the stage, an exposure unit 9 is typically limited in length, for example, for working areas of about 50 cm, only about 6 cm length can be realised with elements ('pixels', each having a LED+microlens) of 2.times.2 mm2, and still provide a high resolution of about 15 pixels per mm of working-area-width.

In addition, the coater 20 and peeler 40 mechanisms are preferably limited in length, also typically about a few cm. For the coater rollers preferably knurled rollers 190 are used as an example of a profiled applicator for flattening and adjusting the layer volume provided from the dispenser. A carefully designed profile allows the liquid to evenly spread to the foil by urging the profile to the foil and allowing the liquid in the recesses of the profile and thus form a layer of uniform height. The system 120 is provided with vibration damping 200 and a protective cap 250. A controller can be arranged to control the method steps carried out by the system 120.

Figure 3:
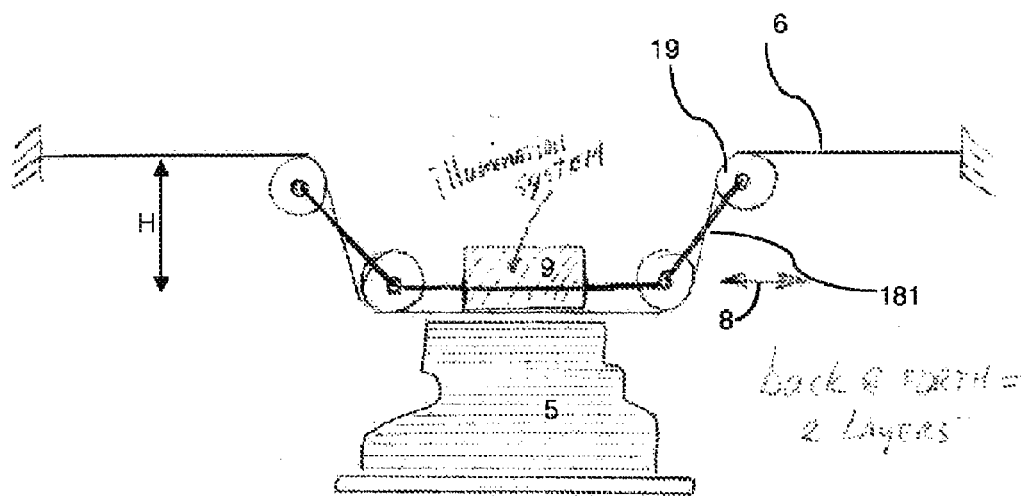
FIGS. 3-5 schematically show sectional sides of further examples of yet other embodiments of a system according to the invention.

FIG. 3 shows a schematic example wherein a schematically foil guiding carriage 181. In one embodiment, the foil guiding stage comprises at least two foil guiding elements 19 arranged thereon defining a contact height H and at least one position distanced from the contact height, for guiding the foil 6 to or from the contact height to contact the tangible object 5 by movement along the tangible object 5 while having opposite ends fixed relative to the tangible object at least during contacting. The stage is operative in both directions to be used either as a coater or as a peeler, so the machine can be operated with a bi-directional movement; in such an embodiment, moving back the complete mechanism from the end-of-scan position to the start-of-scan position is not needed. Accordingly, two layers can be produced in a cycle where the carriage returns to its initial position.

Figure 4:
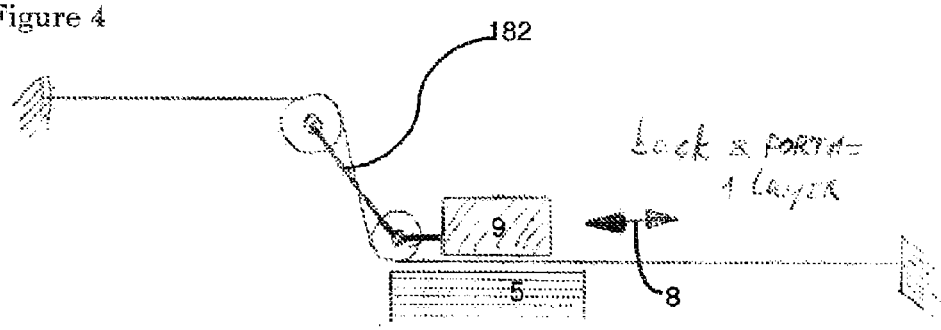

FIG. 4 shows an alternative embodiment, wherein carriage 182 is operated in a unidirectional way: Here a back and forth movement results in the production of a single layer.

Figure 5:
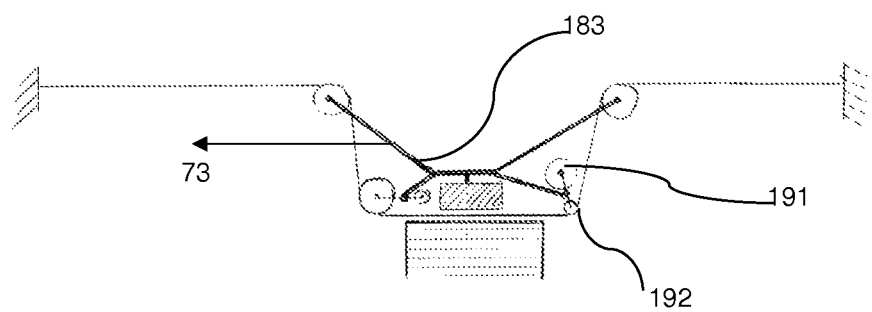

FIG. 5 shows a foil guiding stage arrangement 183 wherein the foil guiding elements comprise a separator guide 192 and an applicator guide 191, the separator guide 192 having a smaller bending radius than the applicator guide. The operating movement is indicated by arrow 73. Preferably, in bidirectional mode, this system comprises a changing system to change the separator guide 192 and the applicator guide 191 relative to the guiding stage direction 73.\

While the embodiments detail construction shapes in the form of a flexible foil, other construction shapes are possible without departing from the scope of the invention, in particular, rigid shapes, such as drums, planar shapes etc. Furthermore, while the moving means are typically provided as a carriage 18, 180, 181, 182, 183, other systems, in particular, drum actuating designs may provide movement of the construction shape to the tangible object.

Figure 6:
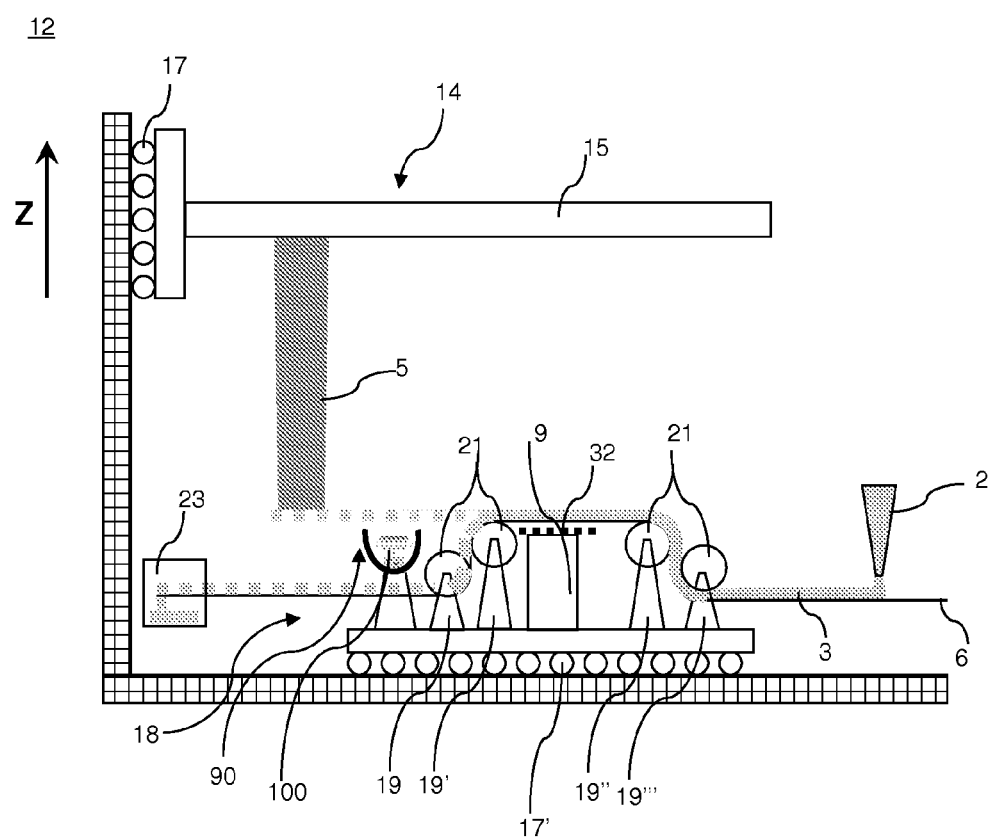
FIG. 6: Schematic representation of an embodiment of an apparatus according to the present invention.

According to a further aspect, an apparatus is provided for building a 3D model by stacking layers in a rapid prototyping or rapid manufacturing process, the apparatus comprising a stage 14 arranged for holding the model, an applicator 18 arranged for providing a layer of curable material to the model, a first energy source 9 arranged for at least partially curing at least part of an intersection pattern in the layer of curable material, a remover for removing the uncured material from the layer outside the intersection pattern, and a second energy source 100 for post-curing the layer, wherein the second energy source may comprise a wide-range energy source. FIG. 6 further illustrates an embodiment, wherein, according to one aspect of the present invention, the system 12 comprises a movable foil guiding stage 18, said foil guiding stage 18 being movable transverse to the z-direction, said foil guiding stage 18 comprising foil guiding elements 19 protruding from the stage 18 for guiding a foil 6 along the model 5 so as to apply a layer of curable material 3 to the model 5.

According to a further aspect, the first energy source 9 can be positioned on the movable foil guiding stage 18, between the protruding foil guiding elements 19 so as to expose the layer of uncured material through the foil 6.

As used herein, the term 'curable material' includes any material which is curable (i.e., which can by polymerized and/or cross-linked) by, for example, a UV light, a laser, ionizing radiation (including but not limited to an electron beam, gamma rays or x-rays), or a combination of any of the foregoing. The term 'curable material' shall also be construed to mean a composite material comprising a mixture of both curable and non-curable materials, such as a resin in which fibers and/or fillers are intermixed.

Partially curing comprises curing to such a degree that the intersection pattern remains stable while removing the uncured material from the layer outside the intersection pattern. The curable material is not fully cured, but only to such an extent that the material is sufficiently stabilized that it is not removed with the uncured material during the step of removing the uncured material outside the intersection pattern.

In the shown embodiment of FIG. 6, the extra energy needed for fully curing may be provided in a post-curing step in a cost-effective way by a wide-range energy source 100. The use of a wide-range energy source 100 is feasible because the uncured material outside the intersection pattern may be removed first.

Fully curing an intersection pattern needs a certain exposure time. Partially curing the intersection pattern means curing the pattern to a lower degree. When the energy source operates at the same power with which the full curing is done, the exposure may be shorter and the speed of the RM and RP processes increases.

The transition of a resin cured by UV from liquid to solid passes a so-called gel-point. At this point all monomers are chemically bonded to form one big molecule. More curing forms more bonds, e.g. cross links, to realize a higher E-modulus of the material. The degree of curing desired in partially curing may be defined by curing the curable material to a degree on or near the gel-point degree of the material, where the intersection pattern remains stable while removing the uncured material from the layer outside the intersection pattern. In practice, curing to a degree on or near the gel-point degree may be interpreted as a degree within a range of about 80%-120% of the gel-point degree.

This gel-point degree of curing pc is defined by the formula pc=2/favg. In this formula, favg is the parameter average 'functionality' related to the number of chemical bonds per monomer, a property of the resin. Typically, values of favg are in the range of about 3 to 6. This means the gel-point is reached at a curing degree pc between about 2/3 and 1/3.

The curing degree used for regular production may be about 0.9. The potential productivity gain by partially curing may then be between about 35% and 170%. A characteristic of typical curable materials that are used in RP and RM is that they may be partially cured up to a certain degree and if energy is provided within a certain time after the partial curing, this energy will add up to the energy for the partial curing until the material is fully cured. The energy provided during the partial curing is not lost, or is at least substantially preserved.

Curing at least part of the intersection pattern includes fully curing as well, as opposed to the partially curing being described above, of a raster pattern in the layer of curable material 3, said raster pattern being dimensioned to hold uncured material. The material may thus be fully cured, but only a raster pattern is cured instead of the complete intersection pattern.

The amount of material that has to be exposed for curing a raster pattern is less than for curing the complete intersection pattern. A laser source may e.g. travel a shorter path, which increases the RP and RM speed. The raster patterns may be further optimized for improving the on and off duty sequence of the individual LED's of the LED light source. This may further improve the output power of the LED's and the building speed.

A combination of partially curing and curing at least part of an intersection pattern, for example, curing a raster of the intersection pattern to a certain degree only, is also possible. This may further speed up the RP and RM process.

One way of removing the uncured material outside the intersection pattern is to blow the material away. This way is especially suitable when the uncured material has a dry, powder like structure or is a low viscosity liquid.

One possibility to hold uncured material inside the raster pattern during the step of removing the uncured material may be realised by dimensioning the raster pattern to provide capillaries for holding the uncured material. When using the mechanism of capillarity, the dimensions of the raster are, for example, related to the viscosity of the uncured material.

Another possibility to hold uncured material inside the raster pattern during the step of removing the uncured material is to provide additional material inside the raster pattern after having first removed substantially all the uncured material from the layer. This introduces an extra process step. However, it also creates the opportunity to fill the object with an additional material that differs from the curable material of the layer if the required characteristics of the surface of the model differ from the characteristics of the inside. The surface may, for example, be smooth or soft, while the inside is desired to be light or rigid. The additional material may be sticky to hold the material inside the raster pattern.

After at least partially curing at least part of the intersection pattern and removing the uncured material outside the raster pattern, the layer may be post-cured with a wide-range energy source 100. The wide-range energy source 100 is typically a wide-range UV light source, for example, but not restricted to, a UV TL light source. However, the use of a wide-range thermal source is also contemplated.

FIG. 6 shows an embodiment of an apparatus 12 for building a 3D model by stacking layers in a rapid prototyping or rapid manufacturing process according to the present invention. The apparatus 12 comprises a stage 14 for holding the model. In this embodiment, the stage 14 is a movable z-stage 15 that may be moved in a z-direction before the applicator 18 provides a layer of curable material to the model. Movement in the z-direction the direction can be transverse to the layer of curable material. The stage 14 may be raised while the applicator 18 is not moving, but it is also possible to lower the applicator 18 as long as the distance between the model 5 and the applicator 18 is increased. In this embodiment, rolling elements 17 enable movement of the z-stage 15.

FIG. 6 shows that the model 5 is connected under the z-stage 15 and that a new layer is stacked from below. For sake of clarity, the layer of curable material is shown with an exaggerated thickness.

In one embodiment, the apparatus 12 comprises an applicator 18 for providing a layer of curable material to the model 5. The apparatus 12 further comprises a remover for removing the uncured material from the layer outside the intersection pattern. In the embodiment of FIG. 6, the applicator 18 is arranged for both providing a layer of curable material to the model 5 and for removing the uncured material from the layer outside the intersection pattern. This is convenient but alternatives for removing the uncured material from the layer outside the intersection pattern are possible, for example, removing the uncured material with a blower. This is especially suitable when the uncured material has a dry, powder like structure or is a low viscosity liquid.

In this embodiment the applicator 18 is formed by a movable foil guiding stage. The foil guiding stage 18 is movable transverse to the z-direction. The movement of the foil guiding stage 18 may be enabled by rolling elements 17. Other ways of moving, like sliding are also possible. The foil guiding stage 18 further comprises foil guiding elements 19, 19', 19" and 19' protruding from the stage 18 for guiding a foil 20 along the model 5 so as to apply a layer of curable material to the model 5. In one embodiment, the foil guiding elements 19 comprise four rollers 21.

In the embodiment illustrated in FIG. 6, the foil 6 is arranged for carrying the curable material supplied from a supply reservoir 2 to the model 5 and for carrying the removed uncured material from the model 5 to a residue reservoir 23. Typically, the uncured material outside the intersection pattern sticks to the moving foil 6 because the adhesive force between the uncured material and the foil 6 are larger than the adhesive force between the uncured material and the model 5.

The applicator 18 may further comprise a supply reservoir 2 for storing the curable material and a residue reservoir 23 for storing the uncured material removed from the layer outside the intersection pattern. The reservoirs may be open or closed. Open may have the advantage that filling or emptying is easier. In a closed reservoir, keeping the curable material under certain operating conditions before using or recycling it may be easier. In this embodiment, the foil 6 may be arranged for carrying the curable material supplied from a closed supply reservoir 2 to the model 5 and for carrying the removed uncured material from the model 5 to the residue reservoir 23. In this embodiment, the applicator 18 may further comprise an actuator (not shown) for moving the foil 6 to and from the model 5.

The foil 6 and the foil guiding stage 18 may be moved independently. In one operating mode, in a first step, the foil 6 is moved so as to provide a layer of curable material beneath the model 5. The curable material is, at that time, not yet in contact with the model 5. In a second step, the foil guiding stage 18 moves along the model 5 to apply the layer of curable material to the model 5, expose the curable material and remove the uncured material. In the second step, the foil 6 does not substantially move relative to the model 5 transverse to the z-direction.

In one embodiment, the apparatus 12 according to the present invention comprises a first energy source 9 arranged for at least partially curing at least part of an intersection pattern in the layer of curable material 3. In the embodiment of FIG. 6 the first energy source 9 comprises a plurality of individually operable LEDs arranged in rows and columns (not shown). The first energy source 9 may be moveably disposed below the layer of curable material 3, such that it can move in a direction parallel to the layer of curable material 3. The motion of the first energy source 9 may be controlled by a controller, which also controls the lighting of the LEDs. In use, the first energy source 9 may be moved rectilinearly in a direction that extends at an angle with the directions of the rows and columns of the LED array 32 to enhance the effective resolution of the system. This technique is described in more detail in copending application EP 07150447.6 in the name of applicant, which is incorporated herein by reference for further information regarding this aspect. The first energy source 9 may be positioned on the movable foil guiding stage 18, between the protruding foil guiding elements 19 so as to expose the layer of uncured material through the foil 6. The energy source may be covered by a transparent plate, e.g. a glass plate to improve the guidance of the foil 6.

The combination of using a LED light source comprising a plurality of individually operable LEDs and partially curing at least part of the intersection pattern may be advantageous. Before explaining this further, an example of a LED light source as used in an embodiment of the present invention will be described in some detail.

In one embodiment, the LED light source 32 comprises a two dimensional matrix of typically about 80.times.120 light emitting diodes (LEDs); that are imaged via a multilens array (not shown) to the layer of curable material 3. The length of the matrix is typically about 60 centimeters. The LEDs may be individually operable to write the intersection pattern with a control speed of an individual LED typically in the order of nanoseconds, by a plurality of electrical pathways, selectively connected to the respective LEDs. In this example, accordingly, the first energy source 9 may be provided by a two-dimensional array of LEDs extending in a plane parallel to the layer of curable material 3, and in between the multi-lens-array and the substrate.

When the complete intersection pattern is fully cured, the LED light source typically moves over the layer of uncured material with a scanning speed of about 10 centimeters per second.

Figure 7:
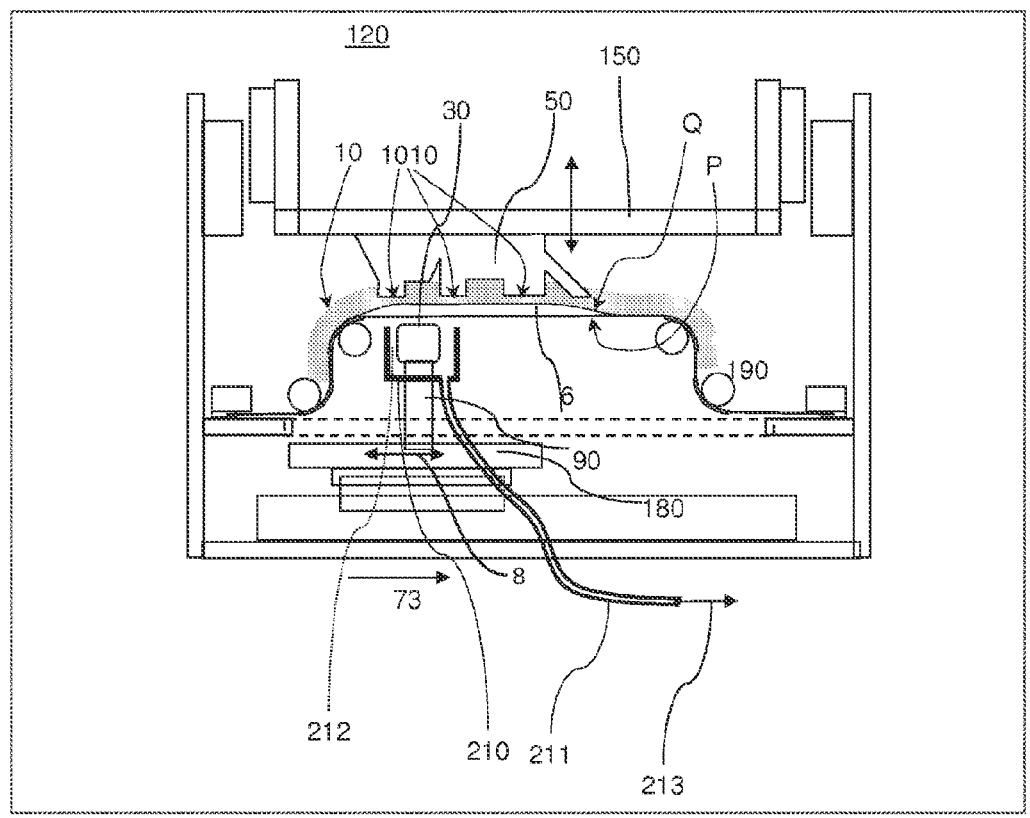
FIG. 7: illustration of lift effects for an object having large cross-section.

FIG. 7 illustrates a problem that can arise when the cross section of the object is large: the capillary forces in the narrow slit between foil 6 and object 50 cause this slit to be narrowed. This may lift the foil from its intended position P to a higher position Q, and makes the layer at the positions to be exposed 1010 thinner. Thus the new layer is too thin. This effect can accumulate during a number of layers, and the accuracy of the product can be severely compromised. Even the building process can be interrupted if the accumulated thickness loss is such that at a certain layer no contact is made any more between the liquid layer moved towards the product and the product itself. A solution for this problem is to apply a compensating downward force on the foil, by creating a pressure difference across the foil.

This can be done by adding a vacuum chamber 210 underneath the foil, more specifically around the exposure unit. An underpressure is applied to the inside 212 of the chamber by applying suction 213 at the connection tubing 211.

In an embodiment, the chamber 210 fits closely (slit of e.g. 1 mm width) around the exposure head 30, to prevent bulging downward of the foil at the slit. Surprisingly, notwithstanding the narrowness of the slit, the required underpressure to prevent the problem of foil lifting is very small, typically 10 mbar or less. Upon analysis it was found that the underpressure is effectively acting on the full area of the exposure head 30.

Figure 8:
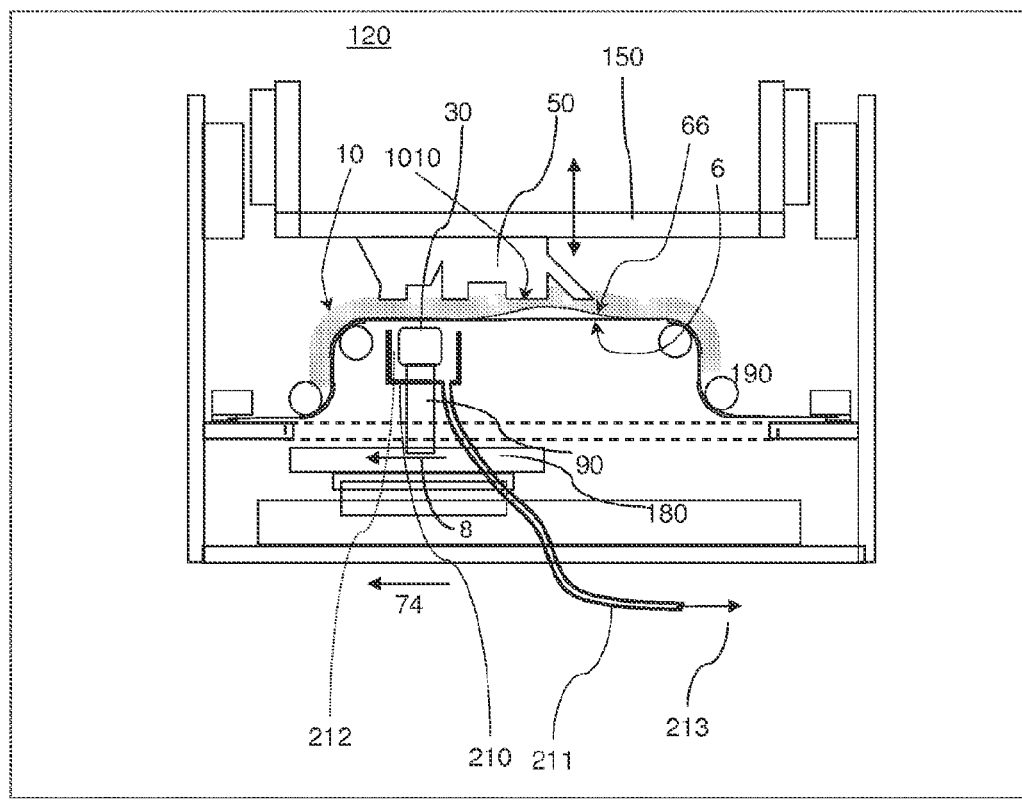
FIG. 8: illustration of residual foil lifting.

In FIG. 8 some residual foil lifting 66 is shown. This does not normally occur because the resin has already been exposed there (in this figure the exposure head is moving right to left) and is strong enough to withstand the capillary forces, but in case lifting yet occurs (depending on e.g. curing speed of the resin used) it can be remedied by extending the vacuum chamber or adding an additional vacuum chamber, always taking care that the slits for letting the underpressure pass from the chamber to underneath the foil are small (.about.1 mm) in order to keep the foil from bulging downward.

Figure 9:
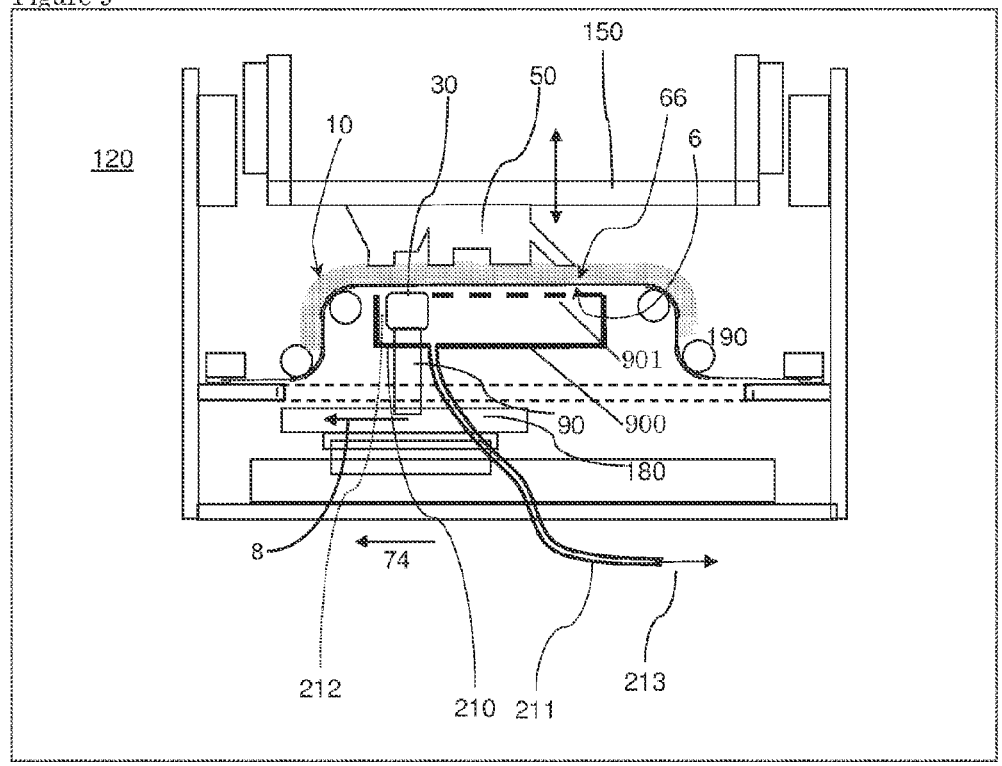
FIG. 9: a schematic embodiment including a perforated plate.

FIG. 9 shows as an example a perforated plate forming a top side 901 of an exposure head extension 900.

It will be clear to a person skilled in the art that the above way of keeping a large area of foil under control with a very small underpressure can be applied in different embodiments, not necessarily only around the exposure head, but in all those cases where spurious forces tend to move the foil away from its intended position. For example, a very small underpressure can be applied, e.g., through a vacuum or a vacuum chamber used at or near the point of the peeling roller or at or near the point where the foil 6 is separated from the last-cured layer of the object (50). In order to stabilize the underpressure preferably, vacuum chamber extension 900 has walls close to foil, to keep leaks here small.

Figure 10:
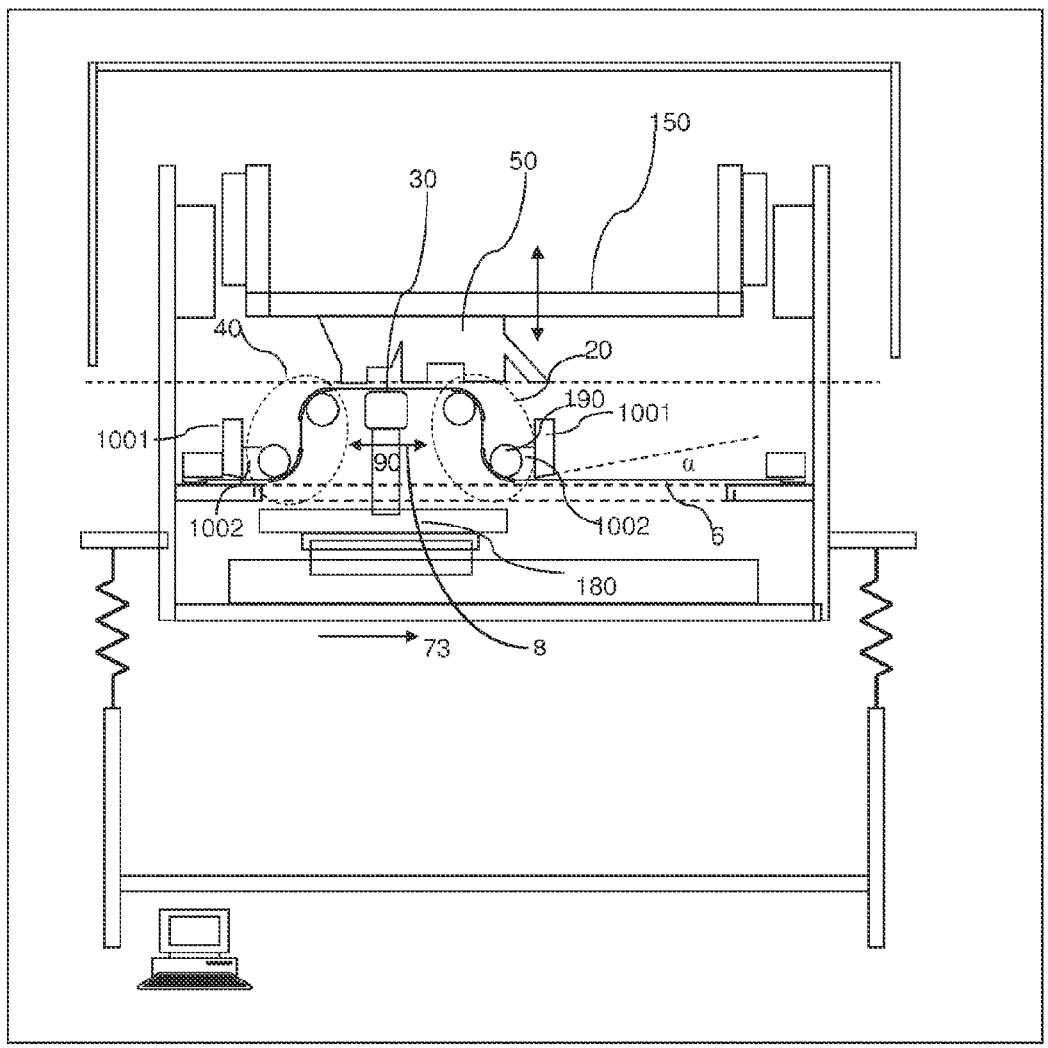
FIG. 10: a schematic embodiment minimizing resin evaporation.

FIG. 10 shows an embodiment wherein resin evaporation is minimized. To reduce evaporation, it is favorable to remove the resin from the foil in areas where the foil has just been separated (or peeled) from the object 50. This can be done by adding a remover or squeegee 1001 that moves together with coater assembly 20 or peeler assembly 40, thus forming a reservoir of material 1002. Preferably this squeegee makes an angle alpha of approximately 10 degrees with the foil 6. This approximate angle was found to have the best scraping capability in one direction and the capability to allow resin to pass in the opposite direction, thus retrieving any resin left on the foil rather than pushing it to the edge of the machine.

Note that 1002 forms a reservoir, because it is enclosed all around: by the squeegee 1001 and by the upward running part of the foil 6. The squeegee 1001 may include extensions having openings for passing shafts of lower roller 190, and seals around the shaft passings. In a bidirectional embodiment, a reservoir 1002 is formed on each side of the carriage 180. And there may be liquid layer providing roller (e.g., a Meyer bar) 190 also on each side of the foil guiding stage.

In an embodiment, the thickness of the liquid layer provided by the coater bars (Meyer bars) is at least equal to the thickness of the next layer, but preferably a bit more. For example, for building with layers of 50 um, a good value for the liquid layer thickness is around 70-80 um. Thus when the foil with the liquid layer is moved towards the object, the space of 50 um between the foil and the previous layer on the object is completely filled with liquid resin. The surplus of resin (20-30 um) is pressed forward in front of the roller that lifts the foil towards the object, or sideways into spaces that may be present in the object as built so far.

The rollers that provide the liquid layer (e.g., Meyer bars) are preferably knurled, or profiled, so that the amount of resin that is transported in the recesses of the Meyer bar from the reservoir side of the Meyer bar to the exposure unit side of the Meyer bar is sufficient to provide the desired (in the example: 70-80 um) thickness of liquid layer. It is to be noted that the liquid in the recesses only partly remains on the foil behind the Meyer bars, and part stays on the Meyer bar. Therefore the size of the recesses has to be determined experimentally.

Figure 11:
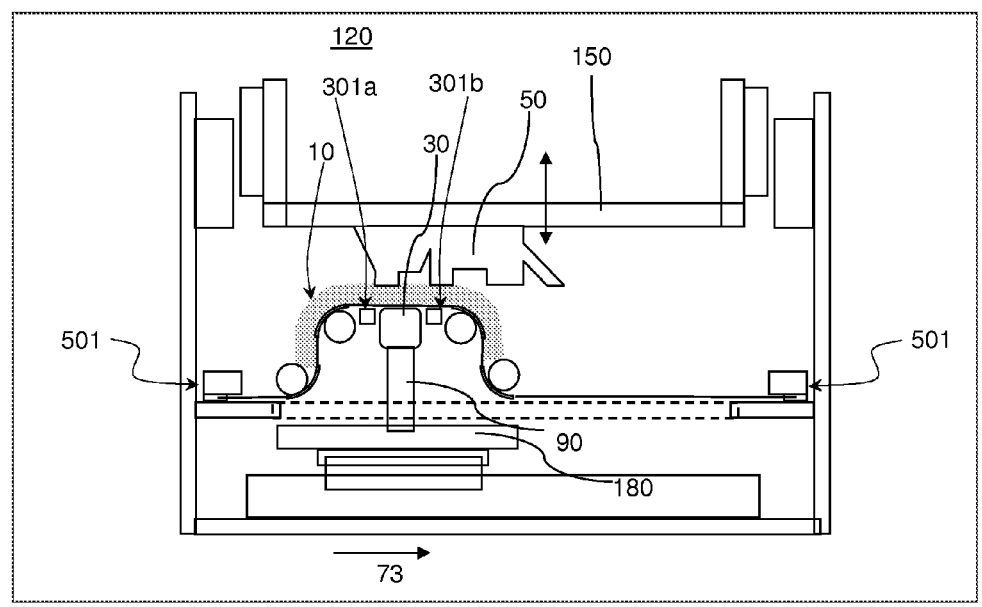
FIG. 11: a schematic embodiment including resin heaters.

FIG. 11 exemplifies an embodiment, where the resin is heated and discloses equipment used for heating and placement to improve the operational temperature conditions of the resin.

For the building process to work well, between the exposure and the separation from the foil, the resin should be cured to a certain extent, in order for the newly formed layer to adhere to the previously built layers of the object. For many resins, e.g. DSM Somos 8120 (an epoxy acrylate), exposed at 365 nm, curing is faster at a higher temperature. In fact, the mentioned resin is found in an embodiment to work well when used above room temperature, preferably approximately between 30 and 40.degree. C. Thus it is beneficial (allows shorter time between exposure and separation) to have a provision to heat the resin to above room temperature. Surprisingly an elegant solution was found to include a small heating bar 301a, 301b to be kept in thermal contact with the underside (non-liquid-contacting side) of the foil, in close proximity of the exposure head. For bidirectional operation, a second heater 301b on the opposite side of the exposure head 30 may be added.

The heater bar 301 is preferably close to the exposure head, to keep the heated area small, and to keep the total system compact (and thereby fast). In case there is also a vacuum chamber, the heater bar(s) can be either inside or outside the vacuum chamber.

At first sight, one might think that such a small bar would not give sufficient temperature increase, because the foil is only in contact with the bar for a very short time, e.g. 0.2 s (heater bar width 2 cm, movement speed 10 cm/s); but we found it does. Analysis showed that this time is sufficient for the heat of the bar to penetrate the foil with resin layer, because the resin and foil are thin (e.g. 0.2 mm in total). The temperature of the bar does not even have to be much above the target temperature to achieve this. E.g. to achieve a foil and resin temperature of 30.degree. C. typically a heater bar temperature of about 40.degree. C. is required.

The heater bar is preferably of a material with high heat conductivity. E.g. it can be an aluminum housing (e.g. a square tube of approximately 2.times.2 cm), heated e.g. by an electric heater inside.

In an embodiment, the underside of the object built so far, and the top of the exposure unit, are at or around the target temperature (30.degree. C. in the example). This state arises automatically after a number of cycles have been performed. Thus, the building process in this embodiment can be started by performing a number of 'dummy' cycles, i.e. cycles where no exposure is performed, and no vertical movement of the z-stage 150 is performed. This heats up the underside of the platform 150 and the top of the exposure unit to the required process temperature. Alternatively, other heating means can be used to pre-heat these parts before starting the actual building process.

For example, a heating element can be built into the platform 150, and the pre heating of both the platform and the top of the exposure unit are carried out with the platform close to the exposure head (e.g. 1 mm distance or less).

Exothermic Resins:

The curing process of most resins is exothermic, i.e. heat is generated in the curing process. Thus the required amount of heating by the heating bars will vary depending on the resin being processed. Even some cooling may be required to keep the process temperature from rising too much. Thus the heater bars may be provided with a cooling element inside, and the amount of heating/cooling may be controlled (automatically or manually), based on a temperature sensor, that is e.g. built into the top of the exposure unit. Similarly, the object platform may contain not only a heater but also a cooling element.

This heating method is much preferable over a larger heating system, e.g. one which keeps the several moving units of the machine, and the resin reservoir, at an increased temperature. The invented heating method keeps the heated part of the total system as small as possible, and thus requires much less power. Another advantage is that the resin is only at increased temperature during the process phase when this is useful (from exposure through separation); it can cool down immediately afterward, thus preventing any unwanted effects in the unexposed resin, such as aging, evaporation, or thermal curing.

Figure 12:
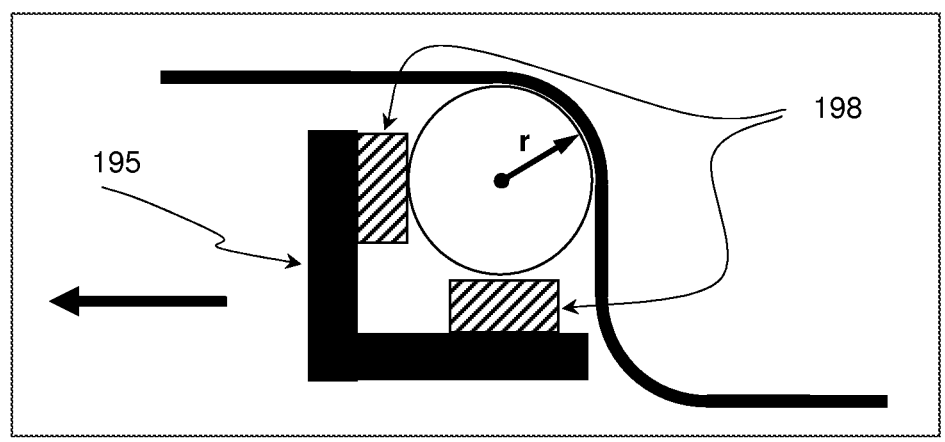
FIG. 12: a detail of a roller assembly.

FIG. 12 discloses a drawing wherein a radius of the roller is disclosed specifically. In addition, FIG. 12 illustrates bearings 198 provided on the outside of the roller. An optimum radius r of peeling rollers is provided in a range smaller than 10 mm. While a large radius r might be supposed to give a gradual, 'gentle' peeling and thus allow sufficient time for the last-cured layer to separate from the foil, surprisingly, it is found that a small radius works better: it allows for a higher separation speed, without damaging the last-cured layer.

A radius of approximately 10 mm or smaller is preferred, typically even approximately 6 mm or smaller. In addition, with a small diameter, in combination with the large width of the working area (e.g. 50 cm), the stiffness of the roller construction may be challenging. The roller has to withstand the tension force of the foil, and still remain straight. A shaft through the centre of the roller typically is not stiff enough. Advantageously the peeling roller is supported by bearings on the outside. These can be positioned at as many positions along the length of the roller as is necessary to achieve the desired straightness. In FIG. 12 outside bearings are shown as friction bearings 198, supported on the stiff peeling unit frame 195; of course any other type of bearing can also be used, in particular roller bearings. In an embodiment, at least four bearings are used. In another embodiment, at least one bearing is located on the horizontal floor of the peeling unit frame and at least one bearing is located on the vertical wall of the peeling unit frame.

The foil may be clamped lengthwise by the clamps 501 in FIG. 11. A mechanism may be provided (not shown) to keep the length of the foil under a predefined tension. The optimum tension depends on the type and thickness of the foil, but may typically be around 10 N per cm of foil width (500 N for a foil width of 50 cm). This tension may keep the foil flat over the area where this is necessary: the part that is at the object contacting height (H in FIG. 1). Significantly lengthwise tension can be sufficient to keep the foil flat over the whole of this area, including its side edges and not require clamps or other tension devices on the side edges.

In another embodiment of the invention, there are also types of foil, typically (but not exclusively; it is not fully understood which foil properties exactly are determining in this respect) those with lower modulus of elasticity, where the lengthwise tension by the clamps 501 is insufficient to keep the foil flat over the whole of the relevant area. In particular the side edges in this embodiment can show a tendency to move up or down or wrinkle from the intended plane. In such cases a solution can be found in the addition of side clamps, which may take one of the following forms or other forms:

The edge of the foil is perforated with holes at regular intervals, e.g. 2 cm; on the exposure unit carriage corresponding sprocket wheels are provided, at least one for each side of the foil, the teeth of which engage in the perforation and which sprocket wheels are forced outward by means of e.g. a spring, so that they exert an outward force on the foil edge, and thus provide a widthwise tension in the foil above the exposure unit.

In an embodiment, an improvement over simple sprocket wheels are toothed belts, the teeth of which engage in the foil perforation and which have a certain length (e.g. 5-20 cm) running parallel to the foil plane.

A number of movable mechanical grippers may be positioned on the machine frame along the sides of the foil. Each gripper comes forward, grips the edge of the foil, and exerts an outward force on the foil edge, for as long as the foil in front of the gripper is at the high level H. So from the moment the lifting roller 19 has passed in front of the gripper until just before the peeling roller 19 arrives in front of the gripper.

A suction clamp may be provided above the foil. The clamp is a long, narrow device on each side of the working area, having a length about equal to the length of the work area (object building area). The bottom surface of each clamp is a suction face, typically realised by a porous material backed by an underpressure chamber.

As soon as part of the foil edge is lifted from the lower lever to the level H where it touches the suction clamp, this piece of foil may be kept sucked against the clamp and it cannot move any more. At the lifting roller, the foil is under tension and thereby is also stretched sideways, and in this sideways-stretched condition both edges are fixed against the suction clamps. Due to the clamps the foil remains stretched sideways even after the lifting roller has passed.

The same effect as with the suction clamp can be realised by a sticky surface in stead of a suction surface. For example a clean soft silicone sheet of e.g. 1 mm thickness acts sticky with respect to many foil materials. If such sticky material is mounted on a stiff clamp frame, and positioned such that the lifting rollers lifts and presses the foil edges against the sticky material, we obtain the desired sideways stretching effect.

Figure 13:
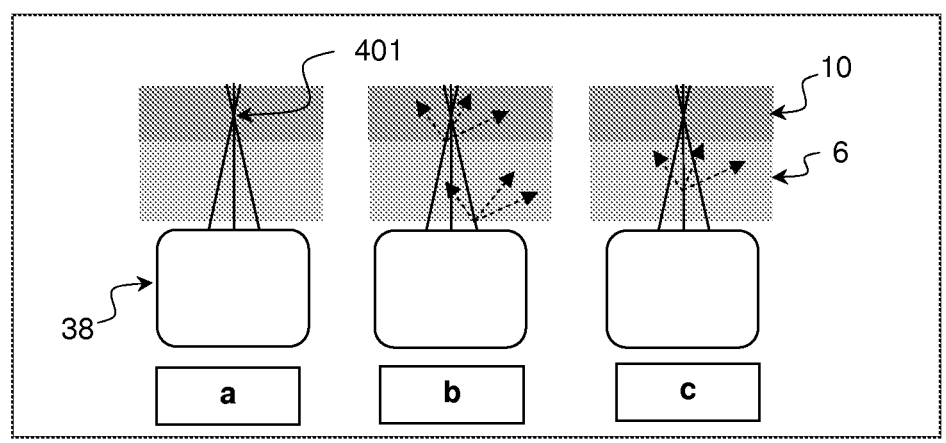
FIG. 13: optical transmission details of a foil.

FIG. 13 discloses an interesting detail since it was found that only the side of the film away from the liquid layer 10 needs to be optically clear; the side facing the liquid layer 10 can be allowed to be diffusive, since surprisingly its diffusiveness is removed by the wetting by the resin that is applied on the surface. This may reduce the manufacturing requirements for the foils.

The foil 6 forms an optical path between the exposure head 38 and the resin to be exposed and thereby influences the optical transmission. In an embodiment illustrated in FIG. 13*a*, the exposure head can be arranged to give a sharp focus 401 halfway in the resin layer 10 (see FIG. 13*a*). In such an embodiment diffusive (matte) structures in the optical path are unfavorable. E.g. matte bottom or top surfaces of the foil would give light scattering as illustrated in FIG. 13*b*. Similarly, diffusiveness of the foil's bulk material (FIG. 13*c*) would lead to light scattering that could destroy the sharp focus 401.

Experiments were run with foil that was matte on one side. With FIG. 13*b* in mind we put the matte side upward, to keep the effect of the scattering smaller. Surprisingly we observed that the scattering at the matte top surface was eliminated at the moment the resin layer was applied to the top surface. Surprisingly, in certain embodiments of the invention, only one of the foil surfaces (and the bulk) needs to be optically clear (non-diffusive), the other surface can be allowed to be matte. The matte side is then to be used as the resin-contacting side. This finding is important, since it is much more difficult to produce foil that is optically clear on both surfaces.

It is noted that the foil side facing the liquid layer should easily separate from (fully or partially) cured resin. Materials that meet this condition include but are not limited to TPX (bulk), silicone (applied as a coating on a foil of different material) and other materials that allow for easy separation.

The method and system of the invention have been tested successfully with acrylate and epoxy (and epoxy-acrylate) resins, using exposure with UV light around 365-375 nm. The following commercial types are among these:
  DSM Somos 8120 (Epoxy-Acrylate)
  Envisiontec R5 Profactory (Acrylate)

To prevent sticking between underside of foil and topside of exposure head, which can occur due to van der Waals forces when these surfaces are very smooth, a very light rubbing with talcum powder or similar may be applied.

Figure 14:
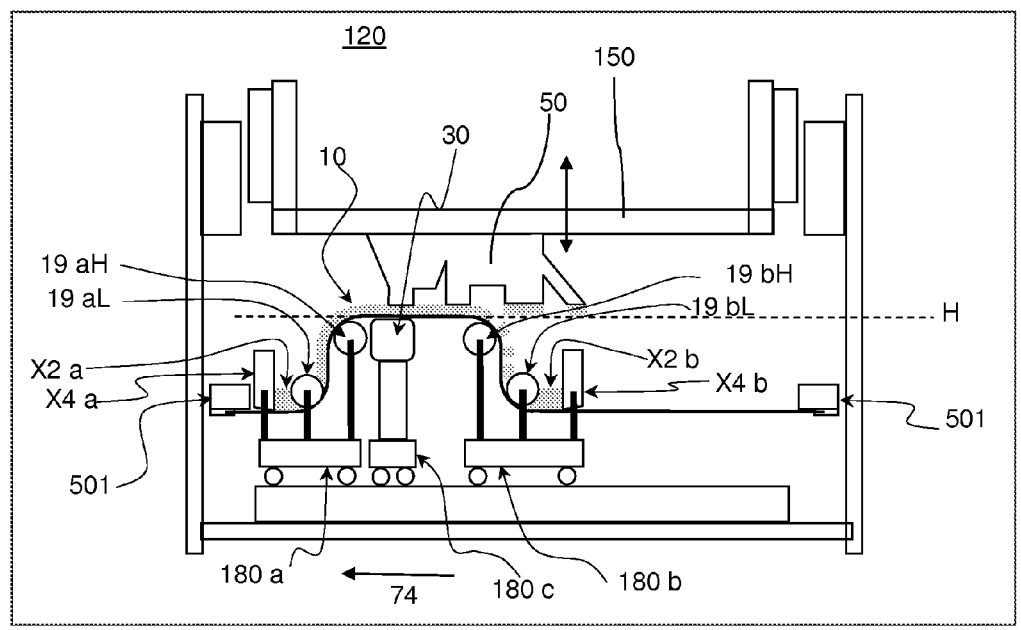
FIG. 14: bidirectional solidification processing.

FIG. 14 provides additional disclosure of a bidirectional embodiment. While the solidifying method can be applied either in a unidirectional way or in a bidirectional way as previously discussed, an advantage of bidirectional use may be that process time can be gained by avoiding to have to return all the process carriages back to their start position before a new cycle can be started. Instead, after a pass in one direction, the carriage(s) can reverse instantly and start the process in the opposite direction.

In one example of a bidirectional embodiment, certain elements of the machine may be configured in mirror-like symmetry so that such elements can switch functions when the direction is switched. Referring to FIG. 14 this can be explained as follows:

As shown here a first process step is carried out in the right-to-left direction 74. Lower roller 19*a*L has the function of providing the liquid layer, upper roller 19*a*H has the function of lifting the coated foil up to the level H;

On the side of the exposure head 30 opposite rollers 19*a*L and 19*a*H, upper roller 19*b*H has the function of peeling roller, and the lower roller 19*b*L has the function of guiding the foil back to the lower level H0 (shown in FIG. 1).

After a single cycle has been completely performed from right to left (the foil has been completely peeled off from the product), a new cycle can be started immediately from left to right. Now the functions of 19*b*H and 19*a*H are interchanged, and the functions of 19*b*L and 19*a*L are interchanged.

So upper rollers 19*b*H and 19*a*H can be designed to be suitable for both the lifting and the peeling function. This constraint may lead to a compromise design w.r.t. e.g. the roller radius, as the peeler roller radius is preferably small, as explained in conjunction with FIG. 12.

In that case the switchable solution discussed in conjunction with FIG. 5 can be used. Additionally, lower rollers 11*a*L and 19*b*L can be arranged to be suitable for both providing a liquid layer of correct thickness, and for guiding the foil. A reservoir can be present on either sides (X2*a* and X2*b*).

Note that the squeegees X4*a* and X4*b* are preferably both present even in the case of unidirectional use (even in that case the resin must preferably be retained within the space defined by the squeegees).

In one example of a bidirectional embodiment, separate carriages for the exposure unit (180*c*) and for the equipment on either side of the exposure unit (180*a* and 180*b*) can be used in contrast to previously disclosed single carriages.

This has the advantage that the distances between the carriages can be optimized for the movement direction, in dependency of the times required for the different subprocesses.

Figure 15:
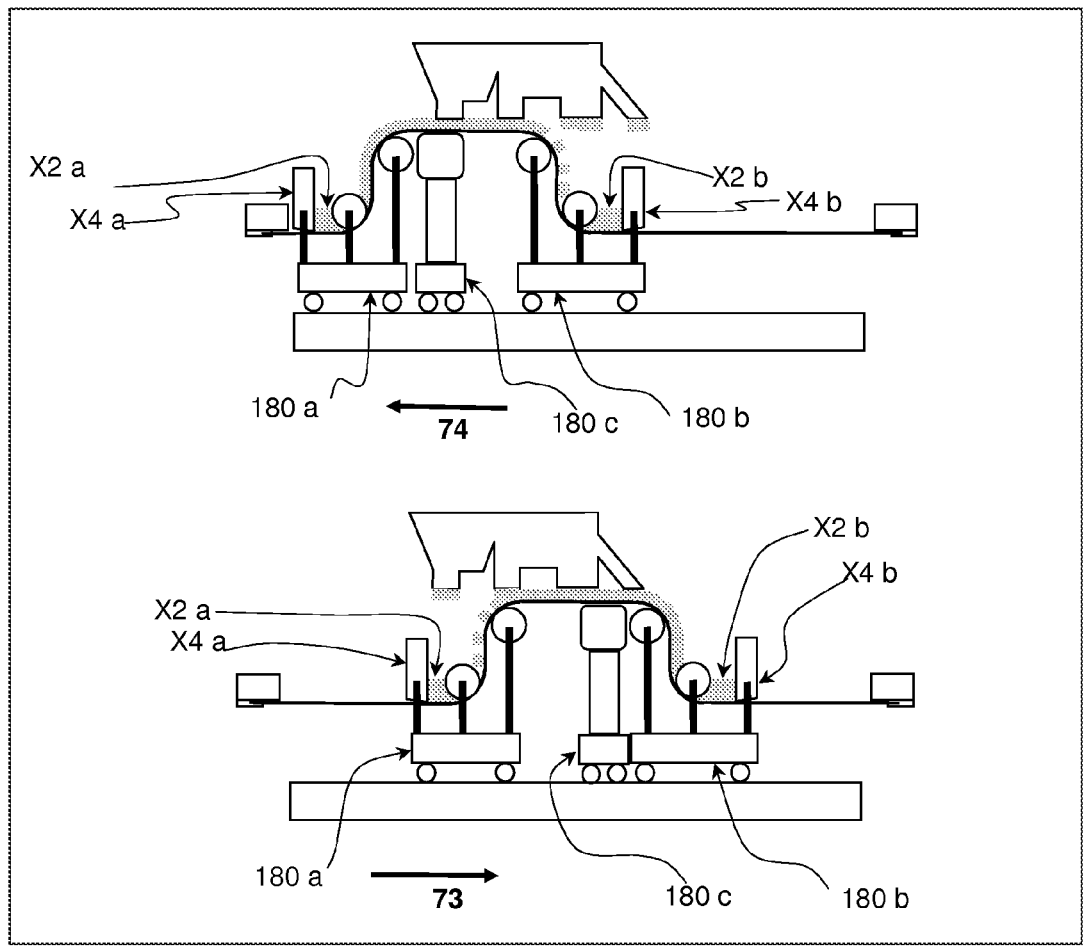
FIG. 15: the embodiment of FIG. 14 in reverse modes.

One example is that some curing time is required between exposure and peeling, to give the resin sufficient strength to withstand the peeling process. So one preferable configuration is to have the exposure unit following the coating unit immediately, but the peeler roller following the exposure unit at a certain distance, corresponding to the required curing time before peeling. The different distances between the units for the two process directions 74 and 73 are shown in FIG. 15.

The detailed drawings, specific examples and particular formulations given serve the purpose of illustration only. While the specific embodiments of the apparatus 12, 120 described and shown herein concern building the model 5, 50 upside down, the teachings of the present invention may be applied to apparatuses that build models right side up or even any other orientation. The aspects of the present invention can also be applied in apparatuses for conventional RP and RM techniques like Selective Laser Sintering (SLS) and Stereo Lithography (SLA). In the foregoing specification, the invention has been described with reference to specific examples of embodiments of the invention. It will, however, be evident that various modifications and changes may be made therein without departing from the broader spirit and scope of the invention as set forth in the appended claims. Furthermore, the object may have any suitable size and shape. Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. However, other modifications, variations and alternatives are also possible. The specifications and drawings are, accordingly, to be regarded in an illustrative rather than in a restrictive sense. While certain embodiments detail certain optional features as further aspects of the invention, the description is meant to encompass and specifically disclose all combinations of these features unless specifically indicated otherwise or physically impossible.

The invention claimed is:

1. A system for layerwise production of a tangible object, the system comprising:
  a construction shape arranged to provide a liquid layer of limited height that does not contact the tangible object, to be brought in contact with the tangible object;
  solidifying means for solidifying a predetermined area of a layer of the liquid, so as to obtain a solid layer of the tangible object, the solid layer thus having a predetermined shape;
  removing means for removing uncured material from the layer outside the intersection pattern;
  moving means for moving, relative to one another, the construction shape to a predetermined position relative to the tangible object, such that the moving means moves the liquid layer on the construction shape into contact with the tangible object, for solidifying a predetermined area of a successive such liquid layer; characterized in that
the system is arranged to move said construction shape and to operate said solidifying means simultaneously, such that the moving means moves the construction shape to bring the liquid layer into contact with the tangible object while the solidifying means solidifies a predetermined area of such liquid layer.

2. A system according to claim 1, wherein the system is further arranged to carry out said layer provision and said solidifying such that solidifying of certain parts of the layer takes place simultaneously with provision of the liquid layer on the construction shape.

3. A system according to claim 1, wherein the construction shape comprises a flexible foil that is bent such that time-dependently varying contacting parts of the liquid contacting side of the flexible foil are in contact with the tangible object for solidifying said certain parts of the layer.

4. A system according to claim 1, wherein the construction shape comprises guiding means and wherein the guiding means are brought in pressing contact with the side of the flexible foil opposite to the liquid contacting side for defining the time-dependently varying contacting parts of the liquid contacting side of the flexible foil.

5. The system according to claim 4, wherein the guiding means comprises a foil guiding stage comprising at least two foil guiding elements arranged thereon defining a contact height H and at least one position distanced from the contact height, for guiding the foil to or from the contact height to contact the tangible object by movement along the tangible object while having opposite ends fixed relative to the tangible object at least during contacting.

6. The system according to claim 5, wherein the foil guiding stage further comprises an applicator system for flattening and adjusting the layer volume.

7. The system according to claim 1, further comprising: a stage arranged for holding the tangible object, the stage being a movable z-stage for moving the tangible object in a z-direction before providing the layer of curable material.

8. The system according to claim 5, said solidifying means further comprising: a first energy source arranged for at least partially curing at least part of an intersection pattern in the layer of curable material, wherein the energy source is positioned on the movable foil guiding stage, between the protruding foil guiding elements so as to expose the layer of uncured material through the foil.

9. The system according to claim 8, said solidifying means further comprising:
  separating means for separating said solid layer from said construction shape, and
  a second energy source for post-curing the layer, wherein the second energy source comprises a wide-range energy source that is positioned on the movable foil guiding stage for post-curing the layer.

10. The system according to claim 8, wherein the first energy source comprises a plurality of individually operable LED's.

* * * * *